(12) United States Patent
Johnson

(10) Patent No.: US 11,281,865 B1
(45) Date of Patent: *Mar. 22, 2022

(54) METHODS AND SYSTEMS FOR GENERATING LINGUISTIC RULES

(71) Applicant: Michael Dudley Johnson, San Mateo, CA (US)

(72) Inventor: Michael Dudley Johnson, San Mateo, CA (US)

(73) Assignee: Michael Dudley Johnson, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,056

(22) Filed: Jul. 10, 2020

Related U.S. Application Data

(63) Continuation of application No. 16/123,745, filed on Sep. 6, 2018, now Pat. No. 10,762,301.

(60) Provisional application No. 62/726,808, filed on Sep. 4, 2018.

(51) Int. Cl.

| | | |
|---|---|---|
| *G06F 40/40* | (2020.01) | |
| *G06F 3/0482* | (2013.01) | |
| *G06F 3/0484* | (2013.01) | |
| *G06N 5/02* | (2006.01) | |
| *G06F 3/04847* | (2022.01) | |

(52) U.S. Cl.
CPC .......... *G06F 40/40* (2020.01); *G06F 3/0482* (2013.01); *G06F 3/04847* (2013.01); *G06N 5/027* (2013.01)

(58) Field of Classification Search
CPC .... G06F 40/40; G06F 3/04847; G06F 3/0482; G06N 5/027

USPC ............................................................. 704/9
See application file for complete search history.

(56) References Cited

U.S. PATENT DOCUMENTS

| | | | | |
|---|---|---|---|---|
| 6,330,007 B1* | 12/2001 | Isreal | ..................... | G06F 3/0481 |
| | | | | 715/207 |
| 7,552,116 B2* | 6/2009 | Chang | ................... | G06F 40/211 |
| 8,060,357 B2* | 11/2011 | Segond | ................ | G06F 16/332 |
| | | | | 704/1 |
| 8,140,323 B2* | 3/2012 | Johnson | ................ | G06F 40/205 |
| | | | | 704/9 |
| 9,292,493 B2* | 3/2016 | Chandramouli | ........ | G06F 40/30 |
| 10,762,301 B1* | 9/2020 | Johnson | ................. | G06F 40/40 |
| 10,902,217 B1* | 1/2021 | Johnson | ................. | G06F 40/51 |

(Continued)

OTHER PUBLICATIONS

U.S. Appl. No. 16/123,745 Notice of Allowance dated Jun. 24, 2020.
U.S. Appl. No. 16/123,745 Office Action dated Mar. 10, 2020.

*Primary Examiner* — Edwin S Leland, III
(74) *Attorney, Agent, or Firm* — Wilson Sonsini Goodrich & Rosati

(57) ABSTRACT

The present disclosure provides methods and systems for generating linguistic rules. The system may comprise: an electronic display with a graphical user interface comprising: (i) one or more interactive elements for receiving an user input indicating one or more edits to a rule, and (ii) a result visualization region for dynamically displaying a result of the rule in response to receiving the one or more edits, wherein the result of the rule comprises an indicator indicating the validity of the rule; and one or more computer processors that are programmed to: (i) generate the result of the rule by processing the rule with the one or more edits against a set of examples; and (ii) configure the graphical user interface to display the result in a user-selected format.

11 Claims, 24 Drawing Sheets

(56) References Cited

U.S. PATENT DOCUMENTS

| | | | | |
|---|---|---|---|---|
| 2006/0106745 A1* | 5/2006 | Armstrong | ............. | G06N 5/025 |
| | | | | 706/47 |
| 2007/0219773 A1* | 9/2007 | Roux | ................... | G06F 40/237 |
| | | | | 704/1 |
| 2010/0125450 A1* | 5/2010 | Michaelangelo | ..... | G06F 40/226 |
| | | | | 704/9 |
| 2013/0138425 A1* | 5/2013 | Luke | ..................... | G06F 40/284 |
| | | | | 704/9 |
| 2013/0173527 A1* | 7/2013 | Phelan | .................. | G06Q 10/10 |
| | | | | 706/59 |
| 2013/0268260 A1* | 10/2013 | Lundberg | ................ | G06F 40/40 |
| | | | | 704/8 |
| 2014/0081892 A1* | 3/2014 | Sellers-Blais | ............ | G06N 5/04 |
| | | | | 706/11 |
| 2016/0259851 A1* | 9/2016 | Hopkins | ............... | G06F 40/211 |
| 2016/0342288 A1* | 11/2016 | Konik | ................ | G06Q 30/0643 |
| 2017/0109002 A1* | 4/2017 | Ghanekar | ........... | G06F 16/9535 |
| 2018/0165279 A1* | 6/2018 | Issaev | ..................... | G06F 40/58 |

\* cited by examiner

Selected corpus entry               ○ Show features

Metadata
link
Product Name: Khokhloma Snow Maiden Christmas Ornament

Context
location
sec(s)
domain productname
section productname lexonomy
 └ subcategory ornament

*FIG. 19*

METHODS AND SYSTEMS FOR GENERATING LINGUISTIC RULES

CROSS-REFERENCE

This application is a continuation application of U.S. application Ser. No. 16/123,745, filed Sep. 6, 2018, which claims the benefit of U.S. Provisional Application No. 62/726,808, filed Sep. 4, 2018, each of which is entirely incorporated herein by reference.

BACKGROUND

Natural language processing (NLP) is the capability of learning, interpreting, and understanding the natural language of humans, such as a syntax (e.g., grammar), semantics (e.g., meaning), pragmatics (e.g., purpose, goal, intent), and/or other units of linguistics (e.g., various lexical relationships). The process of analyzing natural language inputs, such as words, sentences, paragraphs, and large texts may be based on a set of rules or relationships that define how communication is conducted using a language, such as linguistic rules or linguistic grammar. For example, a rule may define dog as a Noun in English, or 狗 as a Noun in Chinese.

The conventional method of writing linguistic rules may require a user (e.g., rule writer) to master a specialized language or understand syntax, such as "Noun->'dog'". This can prove difficulty, as the many of the rules may interact with each other and modification of a rule may have complex side effects on the whole grammar.

SUMMARY

The present disclosure provides systems and methods that can address various drawbacks of conventional systems or methods, including those recognized above. A system of the present disclosure is advantageously able to allow users to generate linguistic rules without deeply or fully understanding syntax. The present disclosure provides systems and methods that are capable of improving efficiency and convenience of linguistic rules generation, which may permit one or more users to add or modify a rule in any user selectable stage of natural language processing. The provided systems and methods may provide a graphical user interface allowing a user to interactively generate or edit a rule without fully understanding syntax. For example, a user may be allowed to generate rules by interacting with (e.g., selecting) linguistic elements via the graphical user interface.

Systems and methods of the present disclosure may also permit one or more users to create or write linguistic rules with real-time feedback on the result of a new rule. In particular, users may be allowed to visualize a result of a new rule in real-time via a graphical user interface provided by the systems. The result may provide information indicating the validity of a rule such that a rule can be verified in real-time and a user may choose to further modify the rule based on the real-time feedback. In some cases, the result may be generated by applying the rule to a set of examples or generating example sentences based on the rule. In some cases, the result may be generated by evaluating the rule against a set of examples such that the user can visualize an overall result of the new rule or rule change. In some cases, the result may include an output of a parsing engine (e.g., parse tree or linguistic information).

In some aspects, a system for generating linguistic rules is provided. The system may comprise: an electronic display with a graphical user interface comprising: (i) one or more interactive elements for receiving an user input indicating one or more edits to a rule, and (ii) a result visualization region for dynamically displaying a result of the rule in response to receiving the one or more edits, wherein the result of the rule comprises an indicator indicating the validity of the rule; and one or more computer processors that are programmed to: (i) generate the result of the rule by processing the rule with the one or more edits against a set of examples; and (ii) configure the graphical user interface to display the result in a user-selected format.

In some embodiments, the rule is a linguistic rule related to a parsing process or a lexing process. In some embodiments, the result of the rule comprises an interactive tree structure including one or more interactive components corresponding one or more lexical tokens. In some cases, the interactive tree structure is generated by a parser. In some cases, the one or more interactive components are displayed with indicators indicating whether a corresponding token is lexed or not. In some cases, the one or more interactive components is selectable such that the linguistic information of a lexical token is dynamically displayed upon selection of the corresponding interactive component. In some cases, at least a portion of the interactive tree structure is collapsible.

In some embodiments, the result of the rule is displayed in switchable formats including a text format and a tree format. In some embodiments, the result of the rule comprises a set of sentences generated by applying the rule to a set of template sentences. In some embodiments, the indicator comprises a color coding scheme and wherein a valid portion and an invalid portion of the result are displayed in different colors. In some embodiments, the user selected format comprises a text format, a tree format, and a tree with user-selected features for visualization.

It shall be understood that different aspects of the invention can be appreciated individually, collectively, or in combination with each other. Various aspects of the invention described herein may be applied to any of the particular applications set forth below or for any other types of the natural langue processing methods and systems disclosed herein. Any description herein concerning the rule analysis, rule generation or natural language processing programs may apply to and be used for any other natural language processing situations. Additionally, any embodiments disclosed in the context of the rule generation system or natural language processing are also applicable to the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 10 shows an example of GUI for defining categorical features;

FIG. 11 shows an example of GUI for defining inflectional features;

FIG. 16 shows an example of defining feature hierarchies via a GUI;

FIG. 19 shows an example of adding context to a rule;

DETAILED DESCRIPTION

Figure 1:
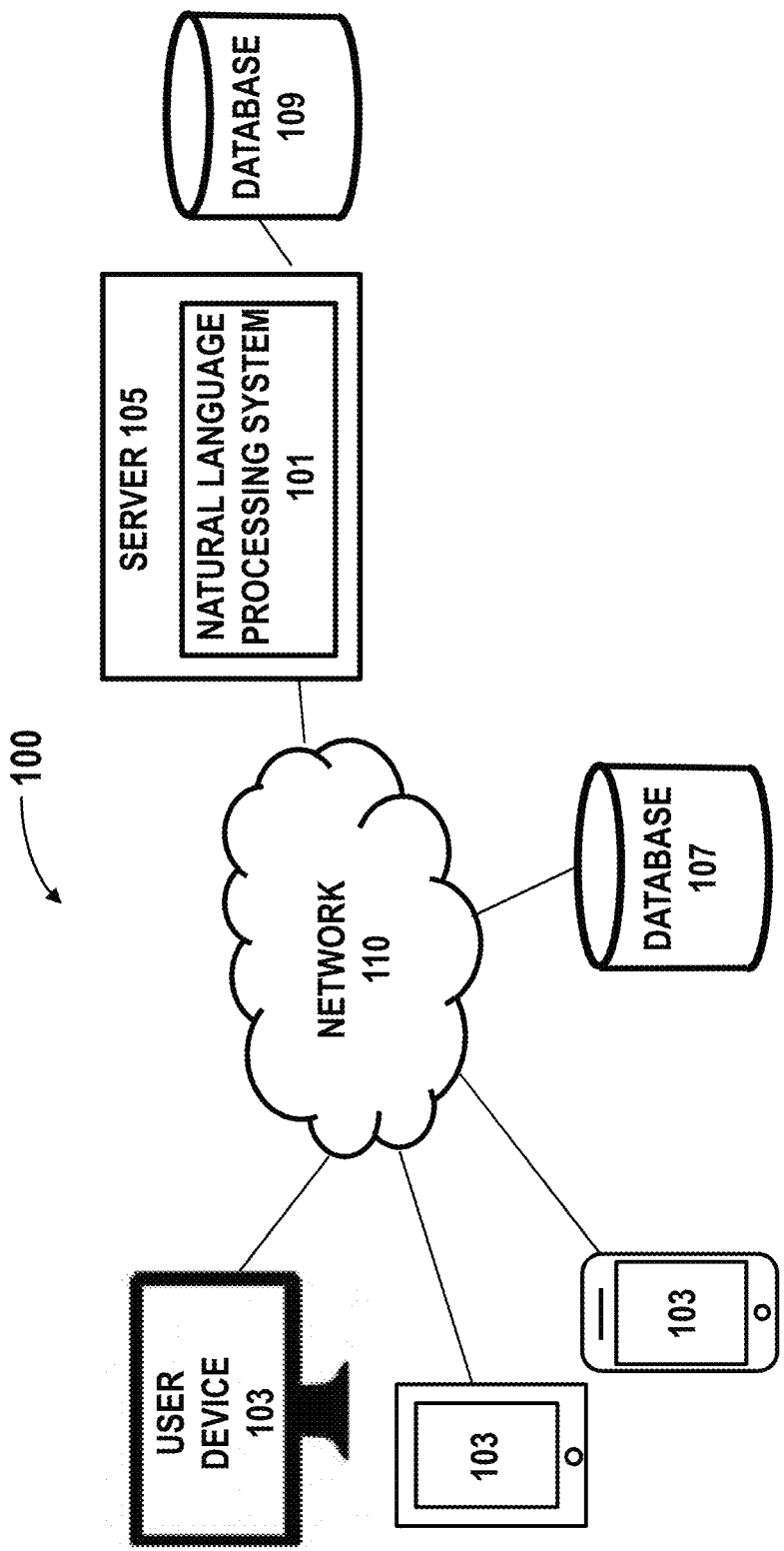
FIG. 1 shows an environment in which a system utilizing natural language processing (NLP) techniques may operate.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Natural language processing may involve various types of rules. For example, the various types of rules may be grammar rules, such as lexical rules, syntactic rules, dependency (semantic) rules and various others. Examples of rule types may include: a word or series of words as an individual lexical entry, various morphologies for a lexical entry, spellings for a morphological variant of a lexical entry, context for a given word or series of words to be treated as a given lexical entry, comparative or absolute rankings of rules, simple definitions of grammatical structures, more complex definitions of grammatical structures that utilize regular-expression-like repetition operators, dependencies between words or multiples series of words, grammatical structures that are valid only in certain cases of agreement, extraction of human-understandable content from HTML based on CSS and other textual and contextual properties of a webpage, and so on.

The various types of rules may relate to different analysis or processes. For example, parsing or syntactic analysis is the process of analyzing a string of symbols, either in natural language or in a computer language, conforming to the rules of a formal grammar. In natural language processing, syntactic parsing or syntactic analysis is the process of analyzing and determining the structure of a text which is made up of sequence of tokens with respect to a given formal grammar. The study of the structure of a sentence is called syntax and it attempts to describe the grammatical order in a particular language in terms of rules which details an underlying structure and a transformational process. Syntax provides rules to put together words to form components of sentence and to put together these components to form meaningful sentences. Semantics, as a branch of linguistics, aims to study the meaning in language. As one knows that a language exhibits a meaningful message because of the semantic interaction with the different linguistic levels phonology, lexicon and syntax. Semantic analysis deals with the meaning of words and sentences, the ways that words and sentences refer to elements in the world. The rules of the system can include features and aspects that relate to syntax, semantics, or both.

A parsing process may be a step by step process. There are various different ways to parse or analyzing the input texts. Different parsing processes may involve different stages, steps, rules or techniques. A parsing process may involve, for example, a token generation stage or lexical analysis, a parsing stage or syntactic analysis, a semantic parsing stage or semantic analysis, or a combined parsing stage incorporating both syntactic and semantic analysis. A parsing process can employ any other steps or stages other than the above. For example, the parsing process may include steps to pre-process the input materials to break apart the input materials into segments (e.g., documents, items, paragraphs, sentences, etc) at different levels. The segmentation may be performed according to the context, domain of the language, and various other segmentation strategies. In some cases, a segment may define the node(s) at the top of a parse tree.

In an example of rule processing, the process may comprise multiple stages including, creating "documents" and "items", segmentation, lexing and parsing. In the stage of creating documents and items, the materials to be processed may break down into documents and items according to the context of the materials. In the stage of segmentation, for each document the parsing engine may determine how many segments there are, and what subdomain of language they are in. For example, the list "red, blue, white, green/black" could be a set of four segments, separated by commas, each of which is an individual Color segment. A segmentation strategy used may be hardcoded such as separating colors using commas, or machine-learned such as building a system to break apart a paragraph into individual sentences. In some cases, each segment may define the overall "StartSymbol" (i.e., nodes at the top of the resulting parse tree). The output of the segmentation stage is one or more segments each of which is with "StartSymbol". In the lexing stage, a set of lexical tokens may be generated for an input segment. In the parsing stage, the output may be zero or more valid parse trees (where a valid tree encompasses the entire segment), or one or more partial parses or parse trees.

Various rules may be applied in at least some the aforementioned stages or steps. For example, in the lexical analysis stage, linguistics rules, grammatical rules and/or lexical rules may be utilized. The various rules or types of rules may be generated via an interactive user interface. In some cases, the rules may be generated or edited by a user via a graphical user interface where the user are not required to be an expert in writing the rules into computer programs. Such rules may be rewritten or converted into computer programs by the system to implement natural language processing or utilized by any other systems.

The systems and methods of the present disclosure may provide results of a new rule or rule change in real-time to a user. The results may be generated by processing the new rule against a set of examples such that the user may have a full understanding of the rule applied to various situations or verify a new rule. In some cases, the results may also provide indicators indicating whether the rule is a valid rule or which portion of the rule is valid/invalid. A user may visualize the results of a new rule or rule change dynamically. In some cases, a user may be guided to drill down one or more linguistic elements to investigate an invalid rule or an invalid portion.

The results may comprise an output of a parsing engine generated based at least in part on a new rule or a rule change. For example, if a rule is added, deleted or edited, the resultant tree(s) may update in real time to give insight into the effect of the change. The results may comprise example (s) (e.g., example sentences) processed by applying the rule or example sentences generated based on default words/templates and the rule(s). The examples may be in any format such as sequence of text strings or text, output of a parsing engine such as a parse tree, a partial parse and others.

The results may further comprise indicators indicating whether the rule is valid or not, or a portion of the rule is valid or not. In some cases, the validity of a new rule or rule change may be reflected by the lexability and/or parsability of the examples. For example, the portion of the example text that is lexed or not lexed, parsed or not parsed may be displayed to the user on the graphical user interface. Indicators such as color coding may be used to show the lexability and/or parsability of the examples. For instance, red color may correspond to not lexing, yellow may correspond to not parsing, and green may correspond to parsing. It should be noted any other suitable indicators such as highlights, animations, image, visual indicator or non-visual indicator (e.g., audible alert) may be used by the system.

Systems and methods of the disclosure may provide a graphical use interface for generating a rule. The rule may a linguistic rule. Generating a rule may include a rule change. A rule change may include one or more of, for example, modification of a rule, adding a new rule, removing a rule, change of definition of a rule, change of the context that must match in order for a rule to apply, moving a rule from one ruleset to another, creating a shorthand definition to be substituted into other rules, change of order of rules and various others that may introduce changes to a rule, multiple rules or a set of rules. In some cases, a new rule may be generated by modifying an existing rule relative to a prior version of the rule. In some cases, a new rule may be generated without a prior version of the rule.

In accordance with the present disclosure, users may refer to people who contribute in rule construction or other users of the platform. The users may be, for example, ordinary people who are not familiar with linguistic rules. Any features of the methods and systems described herein as relating to a user may also relate to an entity such as research center, company or organization. Thus, a user can be understood in a broader sense to include both users who interact with (e.g., provide input) the system to construct a rule, and entities who may access at least part of the system without contributing to the rule construction (e.g., people who use the natural language processing engine).

Methods and Systems for Natural Language Processing

FIG. 1 shows an environment 100 in which a system 101 utilizing natural language processing (NLP) techniques may operate. The system 101 may interact with one or more user devices 103, through one or more networks 110. The system 101 may also be referred to as natural langue processing platform throughout the disclosure.

In some embodiments, the system 101 may comprise a rule generation engine allowing users to generate a rule or input a rule change, and a natural language processing engine utilizing rules constructed with aid of the rule generation engine. The rule generation engine and the rule natural language processing engine may be self-contained components that can be independently operated and worked on by different users concurrently. The architecture of the rule generation engine and its various objects are described later herein. The system 101 can provide NLP capabilities in various applications. For example, the system 101 may be used for content categorization (i.e., linguistic-based document summary, including search and indexing, content alerts and duplication detection), topic discovery and modeling (i.e., accurately capture the meaning and themes in text collections, and apply advanced analytics to text, like optimization and forecasting), contextual extraction (i.e., automatically pull structured information from text-based sources), sentiment analysis (i.e., identifying the mood or subjective opinions within large amounts of text, including average sentiment and opinion mining), speech-to-text and text-to-speech conversion (i.e., transforming voice commands into written text, and vice versa), document summarization (i.e., automatically generating synopses of large bodies of text), machine translation (i.e., automatic translation of text or speech from one language to another). The goal or the output of the system may be different according to the different applications. For example, the output of the system may be a hierarchical data structure produced by the natural language parser. In another example, the output may be annotated document enriched with linguistic information that is available to a call program.

The system 101 may comprise servers 105 and database systems 107, 109, which may be configured for storing or retrieving relevant data. Relevant data may comprise the examples used for processing the rule and generating a rule result, examples used for evaluating a rule change, and various other data as described elsewhere herein. The relevant data may also comprise information such as user data that may not relate to linguistic rules directly. For instance, the user data may be a user preference display settings for viewing a rule result. Each of the components (e.g., servers, database systems, user devices, and the like) may be operatively connected to one another via network 110 or any type of communication links that allows transmission of data from one component to another. For instance, the servers and database systems may be in communication—via the network 110—with the user devices 103 and/or data sources to obtain relevant data, for example.

A server may include a web server, an enterprise server, or any other type of computer server, and can be computer programmed to accept requests (e.g., HTTP, or other protocols that can initiate data transmission) from a computing device (e.g., user device, other servers) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The one or more databases may utilize any suitable database techniques. For instance, structured query language (SQL) or "NoSQL" database may be utilized for storing rules library, user data, examples and other data. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the system may construct the database in order to deliver the data to the users or rule generation engine efficiently. For example, the system may provide customized algorithms to extract, transform, and load (ETL) the data. In some embodiments, the system may construct the databases using proprietary database architecture or data structures to provide an efficient database model that is adapted to large scale databases, is easily scalable, is efficient in query and data retrieval, or has reduced memory requirements in comparison to using other data structures.

The system 101 may be implemented anywhere in the network. The system 101 may be implemented on one or more servers in the network, in one or more databases in the network, or one or more user devices. The system 101 may be implemented using software, hardware, or a combination of software and hardware in one or more of the above-mentioned components within the environment 100.

User device 103 may be a computing device configured to perform one or more operations consistent with the disclosed embodiments. Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device configured to enable the user to enter user defined rule, a change of a rule, and display other information as it relates to parsing result, rule result, rule management, for example. The user device may be a handheld object. The user device may be portable. The user device may be carried by a human user. In some cases, the user device may be located remotely from a human user, and the user can control the user device using wireless and/or wired communications.

The user device may include a communication unit, which may permit the communications with one or more other components in the network. In some instances, the communication unit may include a single communication module, or multiple communication modules. In some instances, the user device may be capable of interacting with one or more components in the network environment using a single communication link or multiple different types of communication links. The user devices 103 may interact with the system 101 by requesting and obtaining the aforementioned data via the network 110.

User device may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations.

In some embodiments, users may utilize the user devices 103 to interact with the system 101 by way of one or more software applications (i.e., client software) running on and/or accessed by the user devices, wherein the user devices 103 and the system may form a client-server relationship. For example, the user devices 103 may run dedicated mobile applications associated with the rule generation engine and/or utilize one or more browser applications to access rule generation engine. In turn, the rule generation engine may deliver information and content to the user devices 103 related to rule processing result, rule change result, examples, for example, by way of one or more web pages or pages/views of a mobile application.

In some embodiments, the client software (i.e., software applications installed on the user devices 103) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

User device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show graphical elements that permit a user to view the result of a rule change, results in a user selected format, select or search a rule and the like. The user device may also be configured to display webpages and/or websites on the Internet. One or more of the webpages/websites may be hosted by a server in the network or the natural language processing platform.

In some cases, the network environment may comprise a cloud infrastructure. One or more virtual systems such as Docker systems may be utilized in the network for allowing multiple users or user devices to interact with the system. In such case, each user device can be considered to be a processing environment that is being used by a developer/participant as part of a linguistic rule development team. The plurality of user devices may comprise heterogeneous thin or thick client platforms (e.g., mobile phones, laptops, and PDAs). For example, the user device may allow one or more users to access applications through either a thin client interface, such as a web browser or program interface. The plurality of client devices may comprise any general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

User devices may be associated with one or more users. In some embodiments, a user may be associated with a unique user device. Alternatively, a user may be associated with a plurality of user devices. A user as described herein may refer to an individual or a group of individuals who are contributing to rule construction or accessing/utilizing the natural language processing engine.

The network 110 may be a communication pathway between the system 101, the user devices 103, and other components of the network. The network may comprise any combination of local area and/or wide area networks using both wireless and/or wired communication systems. For example, the network 110 may include the Internet, as well as mobile telephone networks. In one embodiment, the network 110 uses standard communications technologies and/or protocols. Hence, the network 110 may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

In some embodiments, the system may provide a user interface for a user to add or edit rules via user interaction. The user interface in some cases is a graphical user interface (GUI).

Figure 2:
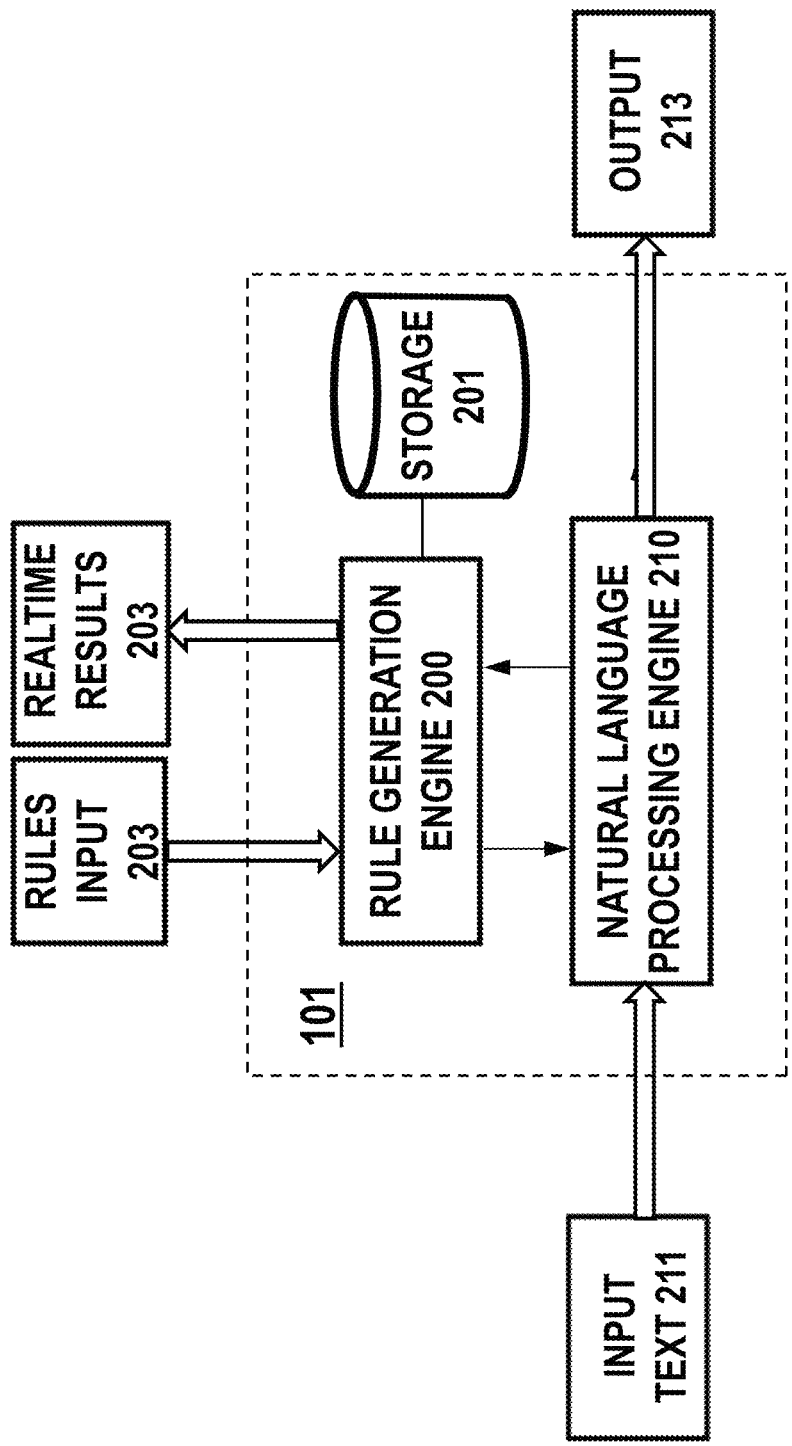
FIG. 2 schematically shows an example of a system for natural language processing, in accordance with some embodiments of the invention.

FIG. 2 schematically shows an example of a system 101 for natural language processing, in accordance with some embodiments of the invention. In some embodiments, the system 101 may comprise a rule generation engine 200 operably coupled to a natural langue processing engine 210. The system 101 may further comprise one or more storage systems 201. The one or more storage systems may comprise one or more databases that can be same as the database as described in FIG. 1. Although the rule generation engine and the natural language processing (NLP) engine are shown as separate components, the rule generation engine and the NLP engine can be integrated as a single component. Similarly, the storage system 201 can also be part of the NLP engine 210 or part of the rule generation engine 200. The rule generation engine can be a standalone system or can be coupled to any other NLP engine, systems or subsystems. The NLP engine and the rule generation engine may be self-contained components that can be independently operated and worked on by different users concurrently.

The NLP engine 210 may be configured to process input text 211 and produce a structured output 213 including the linguistic information. The input text 211 may be raw text from a corpus of natural language documents or partially annotated text string. The NLP engine 210 may be based at least in part on rules generated using the rule generation engine 200 as described herein. The NLP engine may employ any suitable NLP techniques according to the goal and specific application. For example, the NLP may comprise a parser to perform parsing on the input text. The parser may take as input one or more documents or a text string in electronic form and transforms the input documents into annotated documents or structured output. As used herein, the term "parser" generally refers to all of the annotation processing instructions which may be utilized in the annotation of the input text string 211. The annotation preserves the inner grammatical structure of the text string, allowing for a fast search. In general, a parser may include instructions for syntactically, semantically, and lexically analyzing the text content of the input documents and identifying relationships between text fragments in the documents. The parser makes use of syntactic and morphological information about individual words found in the dictionary or "lexicon" or derived through morphological processing (organized in the lexical analysis stage).

In some cases, rules may be constructed by the rule generation engine 200 in advance. Additionally or alternatively, rules utilized by the NLP engine 210 may be changed and evaluated/verified via the rule generation engine concurrently. In some cases, the rule generation engine 200 may allow a user to write rules while the results of evaluating a set of rules against a set of input examples are produced by the NLP engine, and returned to the rule generation engine for visualization by the user.

The rule generation engine 200 may be configured to receive a user input 203 for generating a new rule or changing a rule. The input may comprise definition of a rule, one or more rules, a change of rule and various others. The rule generation engine 200 may be configured to generate results 203 of the rule in real-time and display a visual result to the user. As described above, the results 203 may be generated by processing the new rule against a set of examples such that the user may have a full understanding of the rule applied to various situations. In some cases, the results may also provide indicators indicating whether the rule is a valid rule or which portion of the rule is valid/invalid. A user may visualize the results of a new rule or rule change in an interactive manner. A user may be guided to further investigate an invalid rule or an invalid portion by interacting with the graphical representation of the results or linguistic elements. The results may comprise an output of a parsing engine generated based at least in part on a new rule or a rule change. For example, if a rule is added, deleted or edited, the resultant tree(s) may update in real time to give insight into the effect of the change. The results may comprise example(s) (e.g., example sentences) processed by applying the rule or example sentences generated based on default words/templates and the rule(s). The examples may be in any format such as sequence of text strings or text, output of a parsing engine such as a parse tree, a partial parse and others. The results may also comprise indicators indicating whether the rule is valid or not, or a portion of the rule is valid or not. In some cases, the validity of a new rule or rule change may be reflected by the lexability and/or parsability of the examples. For example, the portion of the example text that is lexed or not lexed, parsed or not parsed may be displayed to the user on the graphical user interface. Indicators such as color coding may be used to show the lexability and/or parsability of the examples such as by highlighting the examples with different colors. For instance, examples high-lightened in red color may correspond to not lexing, examples high-lightened in yellow may correspond to not parsed examples, and examples high-lightened green may correspond to parsed examples. It should be noted any other suitable indicators such as highlights, animations, image, visual indicator or non-visual indicator (e.g., audible alert) may be used by the system.

The rule generation engine 200 may be configured to receive and output information related to generating a linguistic rule via a graphical user interface. Details about the interactive user interface for rules generation are discussed later herein.

The rule generation engine 200 may be coupled to or comprise a storage system 201. The storage system 201 may be configured to track different versions of a rule, rules in different stages of a translation process, examples such as example sentences for processing the rule, examples generated in associated with one or more rules, one or more features for displaying the rule results and various others.

The provided methods and systems may allow a user to generate linguistic rules on an interactive user interface. This is beneficial to provide a real-time feedback to the user for further refine or adjust a rule. A user may visualize a result of a rule change without deeply or fully understanding syntax. In some cases, a user may be guided to investigate a rule or an invalid portion of a rule with aid of the graphical user interface.

Figure 3:
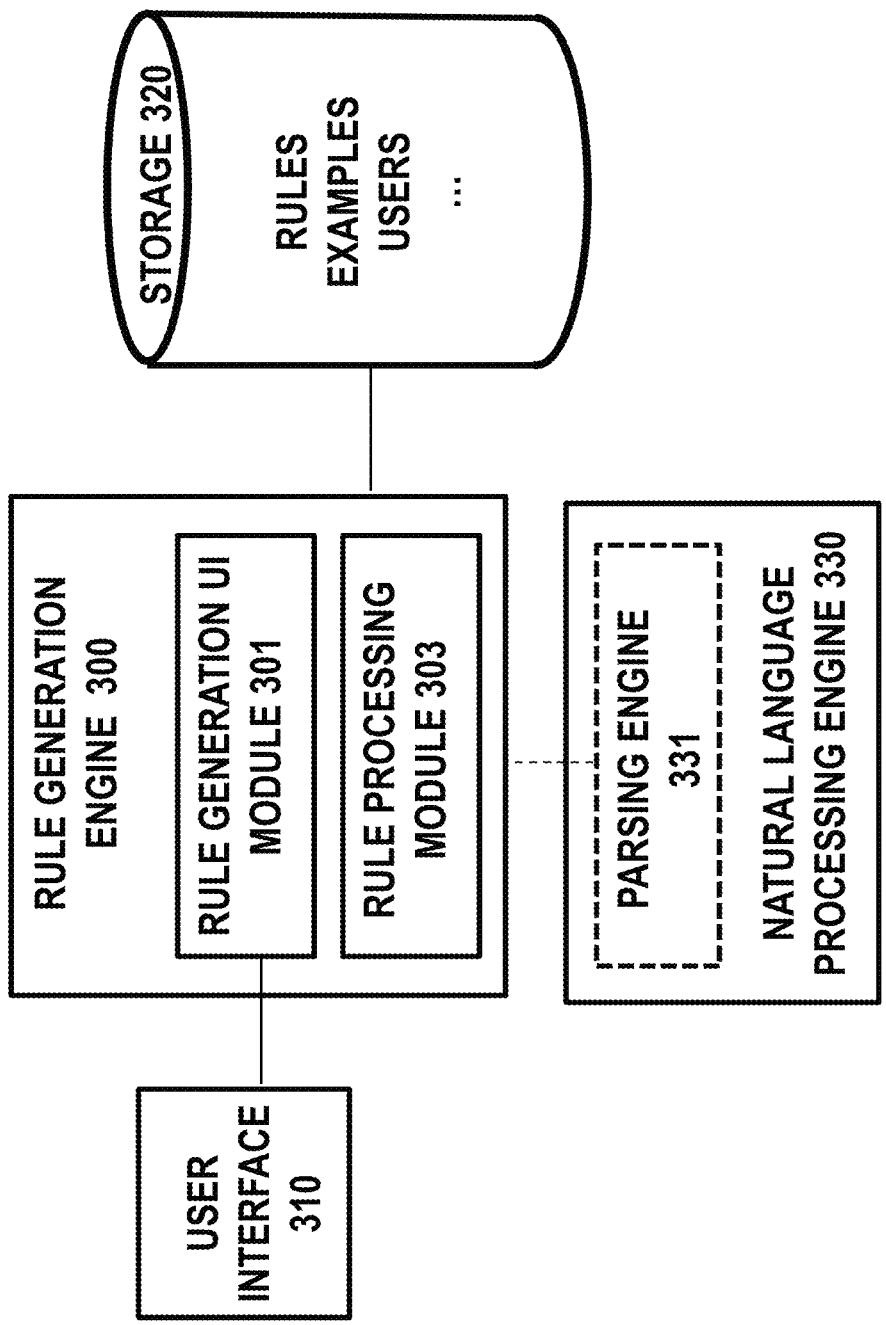
FIG. 3 shows an example of a rule generation engine, in accordance with some embodiments of the present invention.

FIG. 3 shows an example of a rule generation engine 300, in accordance with some embodiments of the present invention. In some embodiments, the rule generation engine may comprise a rule generation user interface (UI) module 301 and a rule processing module 303. In some cases, the rule generation engine may utilize a parsing engine 331 from a combined or connected natural language processing engine 330.

The rule generation UI module 301 may be configured to provide a graphical user interface (GUI). The rule generation UI module may be configured to receive user input entered via the GUI and display results of rules in a pre-configured format or view on the GUI. In some cases, the rule generation UI module may be configured to render a parse tree or resultant tree based on language model. In an example, for a given rule, the rule generation UI module may perform an iterative top-down search for all trees that would contain that rule at the highest level of the tree. For example, with the rules:

Noun[lexeme='dog']->'dog'
Adjective[lexeme='red']->'red'
NounPhrase->Noun
NounPhrase->Adjective NounPhrase Upon receiving a user input (e.g., click on the last rule), a result generated in order of increasing tree depth is provided as below:

red dog
red red dog
red red red dog

The rule generation UI module may allow users to select which of the examples to show on the GUI. A user may be permitted to rank and filter the set of examples such that selected examples (e.g., relevant examples) may be shown to the user. Examples may be selected based on heuristics such as rule complexity, rule specificity, rule priority, lexeme popularity, hand-coded heuristics, corpora, templates, and other factors. This is helpful for showing the cases that the user may not have considered when writing the rule.

In some cases, the rule generation UI module may permit users to input one or more features for configuring a view/display to view a rule result. For example, the rule generation UI module may allow users to switch between different formats of a rule result. In some cases, an example sentence can be visualized both as a sequence of text characters, or as the output of a parsing engine. A user may be permitted to switch between text and a resultant tree structure by providing a user input via the GUI (e.g., clicking into a textbox to direct editing of the text of the example, and clicking outside the textbox to generate the resulting tree). In another example, a user may be permitted to select which features to view or not to view. For example, there may be lexical and/or grammatical features unused by the rules in a parse and a user may select such features to be hidden from displaying. In a further example, a user may select any portion of a parse tree to be in a "collapsed" state or "expanded state" so as to not view or view the selected portion. This provides advantages for fitting more user interested information into a single user interface or a result visualization region of a user interface. As mentioned above, the rule generation UI module may display indicators for a user to visualize parsability and/or lexability of a text thereby visualizing a result of the rule. The indicators may show which portions of a text do and/or do not parse.

The rule generation UI module may allow a user to manage the rules via the GUI. For instance, the rule generation UI module may receive user input command indicating a search of a specific rule in a given collection of rulesets by inputting text into a search field. A user may organize and manage a ruleset via the GUI. In some cases, non-expert users may be permitted to assign and edit rule priority via the GUI. For example, the GUI may allow users to drag and drop rules in sequence. Dragging a rule above another rule may cause the rule generation engine to calculate what the new priority of the dragged rule should be, taking into account its current priority as well as the priority of any rules it should now supersede. To make this more effective the rule generation UI module may show not only the rules used in a given parse, but also those rules which were considered and discarded due to priority, such that the discarded rules can be selected and dragged above the rule(s) that were used.

In some embodiments, the system may automatically take implicit rule priority into account. For example, a more specific rule can be regarded as having a higher priority than a less specific rule. As an example, the lexical rule "golden retriever" can be assumed to be higher priority than the rules "golden" and "retriever". Therefore, if a sentence can be parsed using the lexical entry "golden retriever", it may not need to additionally produce the parses using the combination of "golden" and "retriever" for that word sequence. However, in other portions of the sentence, it may still use the lower priority lexical entries in order to produce a parse.

In some embodiments, the system could also utilize explicit priority. For example, if the following two rules are defined, where <2> is an explicit priority that's higher than <1>:
<2> Noun[lexeme='dog',form=[number='plural']]->'dogs'
<1> Verb[lexeme='dog',form[tense='present']]->'dogs'
<0> Noun[lexeme='black',form=[number='singular']]->'black'
<0> Pronoun[form[number='singular']]->'me'
<0> Sentence->Noun Noun
<0> Sentence->Noun Verb
<0> Sentence->Noun Verb Pronoun If multiple full parses are produced, then the system may utilize rule priority to discard some or all of the parses. For instance, the system may take the set of all rules used in a parse, and discard any parses where the attached set of priorities is lower than the set of priorities for the highest parse. In an example, the above rules and the sentence "black dogs", may produce 2 parse trees:
Sentence->Noun['black'] Noun['dogs'], with priorities (0,0, 2)
Sentence->Noun['black'] Verb['dogs'], with priorities (0,0, 1)

In this case, the second parse may be discarded to give only the first parse.

In another example, the above rules and the sentence "black dogs me", may produce 1 parse tree: Sentence->Noun['black'] Verb['dogs'] Pronoun['me'], with priorities (0,0,1,0). Such priorities could be absolute or relative, as well as can be constrained by context and other filters.

In some embodiments, the rule generation UI module may generate and provide linguistic elements on a GUI whereby at least a portion of the linguistic elements can be selected by a user for generating a linguistic rule. The linguistic elements may include, for example, a lexical category (e.g., noun, verb, adjective), phrasal category (e.g., noun phrase, verbal phrase, adjectival phrase, prepositional phrase), dependency, features (e.g., inflectional features, morphology), word senses, features hierarchy and lexonomy, and various others.

The rule processing module 303 may be configured to generate a result of a rule against a set of examples. In some cases, the rule processing module 303 may be configured to generate a parse tree, or generate preview examples by applying the rule to a set of examples. For example, the rule processing module 303 may automatically generate preview sentences using default terms (e.g., 'ball'), for all inflectional forms, or generate a set of preview sentences where the lexeme was used in either a parsed tree or a partial parse.

The preview sentences or preview examples may also be referred to as examples or example sentences. The examples may be generated by the rule processing module 303. In some cases, the examples can be generated by hardcoded templates, indexing the set of all sentences by which rules are used to parse it, showing a subset of the relevant ones, and using automatic tree generation based on the language model. The examples provide advantages for a user to determine whether a rule is good or not. For example, if the Noun 'sheep' has the plural form given as 'sheeps', and an example sentence shown is "I have 2 sheeps", a mistake or an invalid rule can be easily observed.

For rules where the variation is bounded, such as lexical rules, hardcoded templates may be employed. For example, English verbs have a typical set of conjugations based on tense and subject plurality. These template sentences may need to have general subjects, direct objects, and contextual information indicating tense, in order to highlight mistakes only if due to the rule. For example, the noun 'a ball' can be the direct object of almost all verbs. Then depending on which rule type is added, the template may use the related forms of that rule to generate sentences. For example, if the verb added is the ditransitive phrasal verb "throw away", the rule processing module may take templates or template sentences such as:
I <present tense, singular> the ball away
Yesterday I <simple past tense, singular> the ball away
Tomorrow I will <future tense, singular> the ball away
Right now, they are all <present continuous tense, plural> the ball away
and generate results as:
I throw the ball away
Yesterday I throwed the ball away
Tomorrow I will throw the ball away
Right now, they are all throwing the ball away The automatically generated example sentences allow the user to easily see that the simple past tense form of the verb is wrong.

The rule processing module may be configured to manage a set of rules. The rule processing module may, for example, track different versions of a rule, different rules associated with a stage in a translation process, priority or rules, track example sentences related to a rule, and various others. For example, by building an indexing mechanism that matches example sentences to the rules used to parse them, a user may be permitted to reverse lookup some of or all of the example sentences by a given rule. The rule processing module may implement the storage mechanism or versioning techniques as described above. In some cases, the rule processing module may be configured to track the versions of rules such that a user may be permitted to select version of a rule for editing. In some cases the rule processing module may also be configured to manage other data stored in the storage system 320. For example, the examples may be updated and managed by the rule processing module.

The storage unit 320 can be the same as the storage device as described above. For example, the storage unit may comprise databases. The storage unit 320 may be configured to store data including, but not limited to, set of rules, different versions of a rule, examples, default terms/templates for generating examples, features for configuring displaying a result, data about users in the system and various others as described elsewhere herein.

The rule generation UI module may be in communication with a user interface 310. The user interface 310 may comprise a graphical user interface. The user interface may allow a user to interact with the rule generation engine 300. The user interface may be configured to receive user input and output information to a user. The user input may be related to editing a rule, adding a rule or deleting a rule, for example. The user interface may include a screen such as a touch screen and any other user interactive external device such as handheld controller, mouse, joystick, keyboard, trackball, touchpad, button, verbal commands, gesture-recognition, attitude sensor, thermal sensor, touch-capacitive sensors, or any other device. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. Examples of the graphical user interface are described later herein.

The UI, such as GUI, can be provided on a display of an electronic device of the user. The display can be a capacitive or resistive touch display, or a head-mountable display (e.g., Google® Goggles). Such displays can be used with other systems and methods of the disclosure. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. The GUIs may be provided in a software, a software application, a web browser, etc. Links may be generated through an application programming interface (API) which is a set of routines, protocols, and tools for building software applications. The user may interact with the GUI through direct touch on a screen or IO devices. A user interface may enable a user to interact with systems of the disclosure, such as for generating linguistic rules. In some situations, the user interface is a graphical user interface (GUI) having various graphical, textual, audio and video elements.

A user interface can have a search field or search toolbar that enables a user to input one or more search terms to be used by the system to conduct a search. The search field can include a drop-down, pull-down or other type of menu to enable a user to select, for example, commonly used words or previous search strings. A user interface can have various other interactive elements such as buttons, text box and the like such that a user may provide input command or contents by directly typing, clicking or dragging such interactive elements. More examples of the user interface are described later herein.

Figure 4:
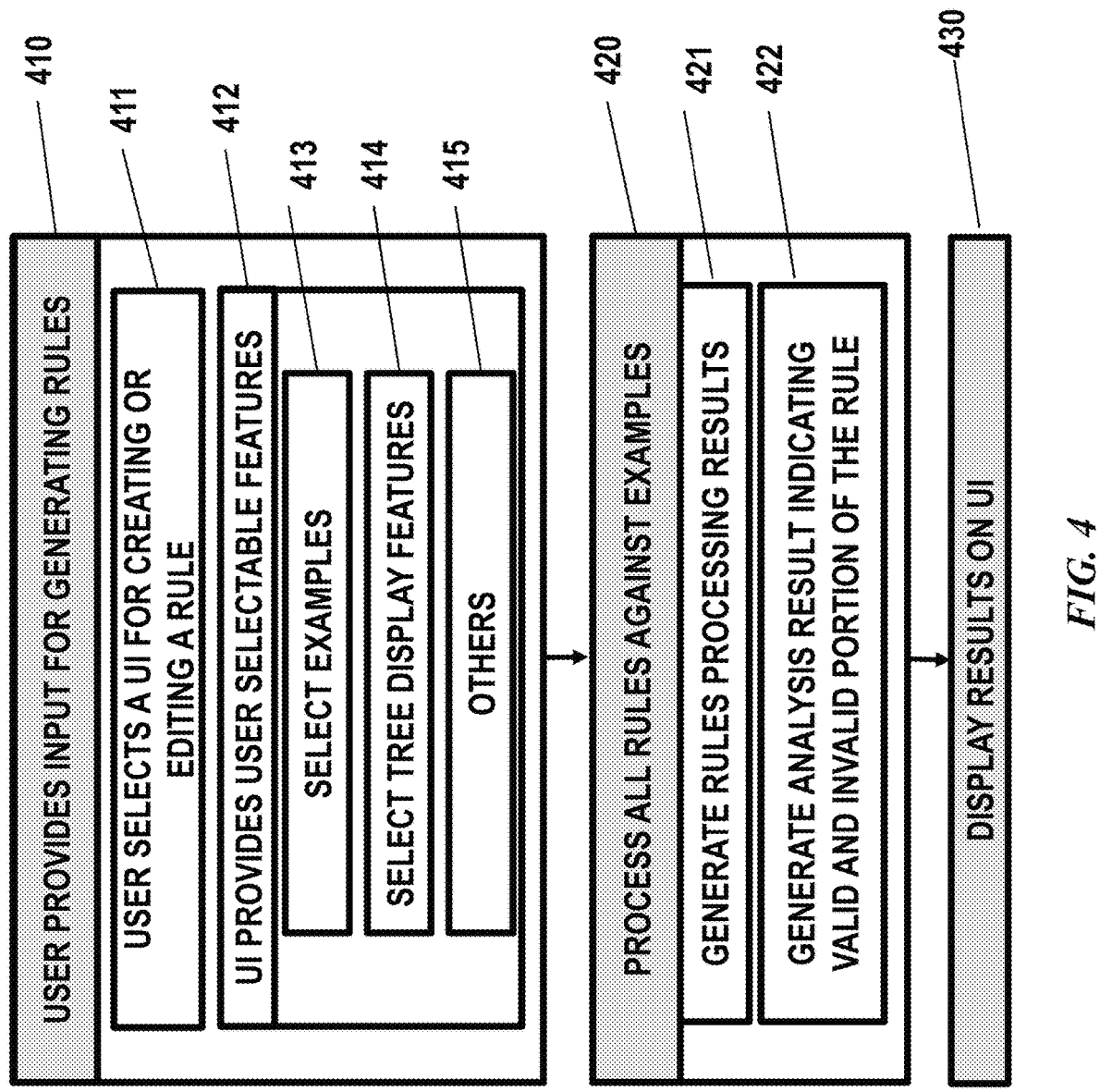
FIG. 4 shows an example of a process for generating a linguistic rule.

FIG. 4 shows an example of a process for generating a linguistic rule. The process may begin with receiving one or more user inputs (operation 410). The user input may be provided via a graphical user interface (GUI). In some cases, a user may select a user interface corresponding to the type of the rule or a stage (operation 411). In some cases, a user may optionally provide input for selecting one or more features (operation 412). The one or more features may relate to settings or configurations for displaying a rule result (operation 414) such as hiding a portion of a parse tree, hide features/elements that are not used in a parse from displaying in a parse tree, and various other features (operation 415). The one or more features may also include selection of examples to be shown (operation 413).

Upon receiving the user input, all rules including the changes from the user may be processed against the examples (operation 420). In some cases, a rule result such as examples generated by applying the rules, a parse tree, a partial tree and the like may be generated (operation 421). In some cases, indicators indicating validity of the rule may be generated (operation 422). For example, a portion of the text parsed/not parsed or lexed/not lexed may be marked by the indicators for showing the lexability or parsability of the text. The result may be transmitted to a GUI and displayed to the user in real-time (operation 430). In an example, a user may be guided by the indicators to investigate the portion of the text that is not parsed and further modify the rule based on the result.

Although FIG. 4 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For instance, any of the steps can be repeated any number of times until a rule is verified to be good. The method may also be modified in accordance with other aspects of the disclosure as provided herein.

Computer System

Figure 5:
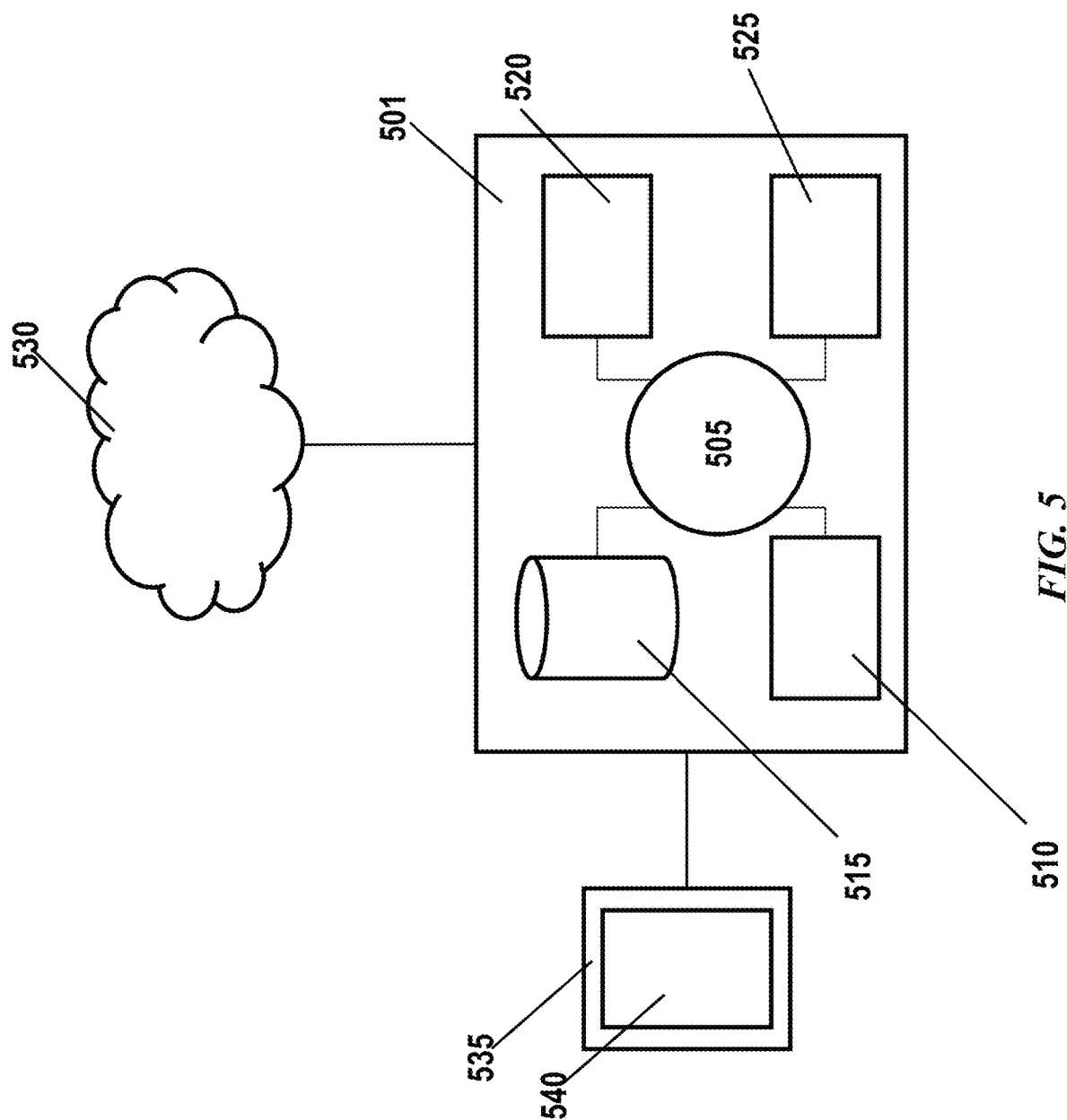
FIG. 5 shows a computer system that can be configured to implement any computing system disclosed in the present application.

The rule analysis engine, natural language processing engine, or the natural language system can be implemented by one or more processors. In some embodiments, the processor may be a processing unit of a computer system. FIG. 5 shows a computer system 501 that can be configured to implement any computing system disclosed in the present application. The computer system 501 can comprise a mobile phone, a tablet, a wearable device, a laptop computer, a desktop computer, a central server, etc.

The computer system 501 includes a central processing unit (CPU, also "processor" and "computer processor" herein) 505, which can be a single core or multi core processor, or a plurality of processors for parallel processing. The CPU can be the processor as described above. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. In some cases, the communication interface may allow the computer to be in communication with another device such as the imaging device or audio device. The computer may be able to receive input data from the coupled devices for analysis. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system

501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

Methods and systems of the present disclosure can be implemented by way of one or more algorithms. An algorithm can be implemented by way of software upon execution by the central processing unit 505. The algorithm can, for example, partition a computer model of a part according to a hierarchy, receive user inputted data for modifying one or more parameters and produce a machine code.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The memory 510 can be a volatile or non-volatile, magnetic, semiconductor, tape, optical, removable, non-removable, or other type of storage device or tangible and/or non-transitory computer-readable medium that stores programs, such as the rule generation engine and operating system. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, and EPROM, a FLASH-EPROM or other flash memory, NVRAM, a cache, a register or other memory chip or cartridge, and networked versions of the same.

The memory 510 may store instructions that enable processor to execute one or more applications, such as the rule generation engine and operating system, and any other type of application or software available or executable on computer systems. Alternatively or additionally, the instructions, application programs, etc. can be stored in an internal and/or external database (e.g., a cloud storage system—not shown) that is in direct communication with computing device, such as one or more databases or memories accessible via one or more networks (not shown). The memory 510 can include one or more memory devices that store data and instructions usable to perform one or more features provided herein. The memory 510 can also include any combination of one or more databases controlled by memory controller devices (e.g., servers, etc.) or software, such as document management systems, Microsoft SQL databases, SharePoint databases, Oracle™ databases, Sybase™ databases, or other relational databases. Data used in the parsing process such as examples, rules, use defined display features, and the like may be stored in the one or more databases.

The computer system 501 may be communicatively connected to one or more remote memory devices (e.g., remote databases—not shown) through a network. The remote memory devices can be configured to store information that computer system 501 can access and/or manage. By way of example, the remote memory devices may be document management systems, Microsoft SQL database, SharePoint databases, Oracle™ databases, Sybase™ databases, Cassandra, HBase, or other relational or non-relational databases or regular files. Systems and methods provided herein, however, are not limited to separate databases or even to the use of a database.

The computer system 501 can communicate with one or more remote computer systems through the network 530. For instance, the computer system 501 can communicate with a remote computer system of a user. Examples of remote computer systems include personal computers, slate or tablet PC's, smart phones, personal digital assistants, and so on. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface 540 for providing, for example, UI for generating linguistic rules. Examples of UI's include, without limitation, a graphical user interface (GUI) and web-based user interface. The user interface 540 may be the same as the user interface as described in FIG. 3. Alternatively, the user interface may be a separate user interface.

Methods and systems of the present disclosure can be implemented by way of one or more algorithms. An algorithm can be implemented by way of software upon execution by the central processing unit 505.

EXAMPLES

Example 1

A user may generate a lexical rule via the GUI. Lexical rules may refer to a word or words and define both semantic and syntactic properties. Below are examples of grammar for writing lexical rules.

The following example defines that both 'centre' and 'center' are the same thing; a Noun with the lexeme 'center':
Noun[lexeme='center']->'centre'
Noun[lexeme='center']->'center'

The following example defines that the word 'front' can be recognized as either a Noun or an Adjective:
Noun[lexeme='front']->'front'
Adjective[lexeme='front']->'front'

Below example defines that the past participle form of the Verb 'eat' is 'eaten':
Verb[lexeme='eat',form=[tense='past',participle='true']]->'eaten'

Below example defines that the simple present first-person singular tense of the Verb 'run' is 'run':
Verb[lexeme='run',form=[tense='present',
  number='singular',person='first',participle='false']]->'run'

Below example defines that 'blouse' is a Noun, and semantically refers to an item of apparel, worn on the top half of the body, in a class of apparel named 'shirt'. It defines the singular form as 'blouse' and the plural form as 'blouses'.
Noun[lexeme='blouse',cat=[category='apparel',
  subcategory='top',class='shirt'],form=
  [number='singular']]->'blouse'
Noun[lexeme='blouse',cat=[category='apparel',
  subcategory='top',class='shirt'],form=
  [number='plural']]->'blouses'

Following example defines that the words 'police' and 'officer', in sequence, can be described as a single lexical entry with the lexeme 'police officer', and that semantically the term refers to something that is human, and an occupation that is respected.
Noun[lexeme='police officer',cat=[category='occupation',
  respected='true',humanness='human']]->'police officer'

Following example defines that the string "18M", can be representative of a ClothingSize (a semantic/syntactic label), where the feature "size" has the value "18 month", and the feature "str" has the value "18M". It says that "18month" has the same syntactic/semantic value, except that it matches the string "18month" instead of "18M":
ClothingSize[size='18 month', str='18M']->'18M'
ClothingSize[size='18 month', str='18month']->'18month'

Figure 6:
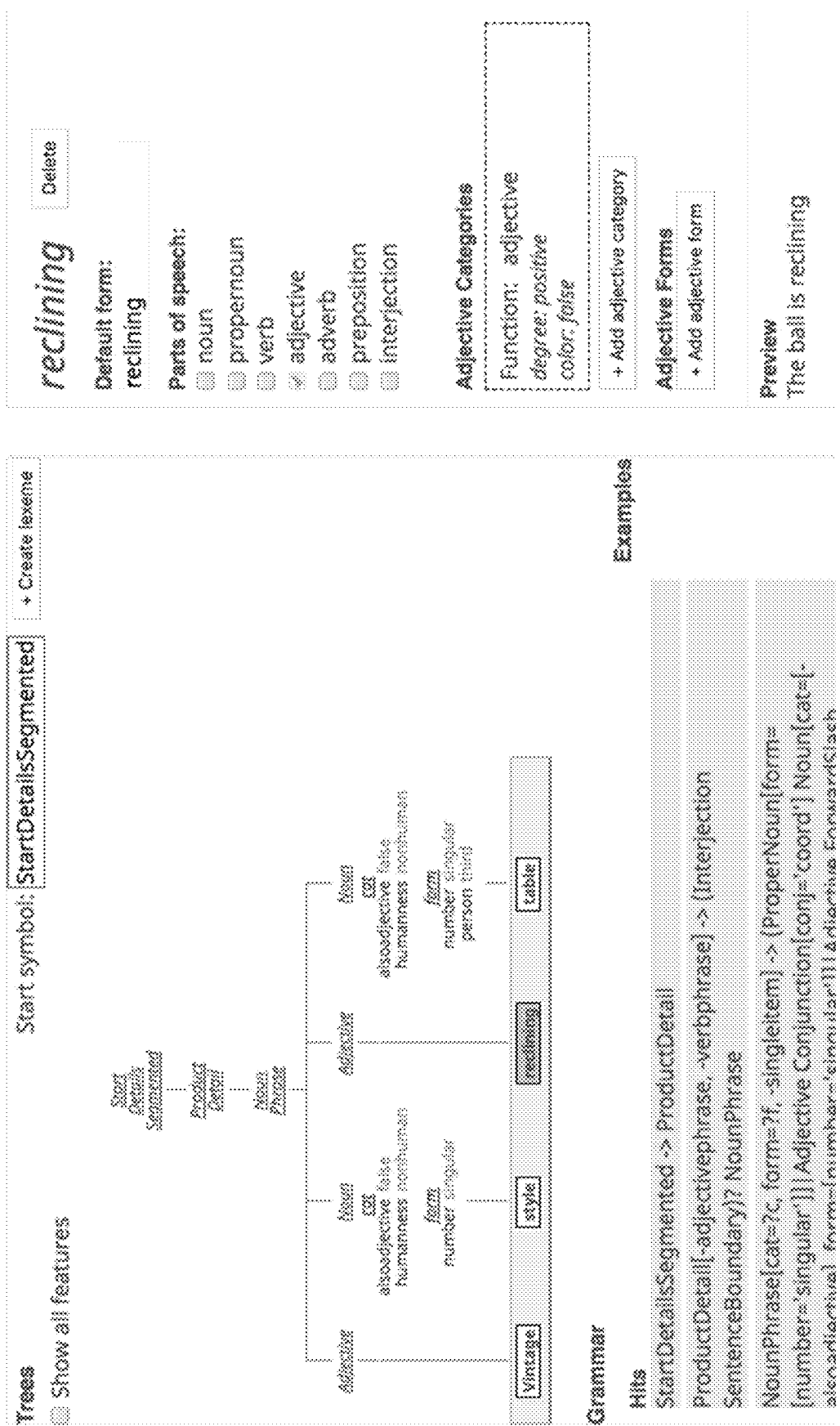
FIGS. 6-9 show examples of generating a lexical rule via a GUI.
Figure 7:
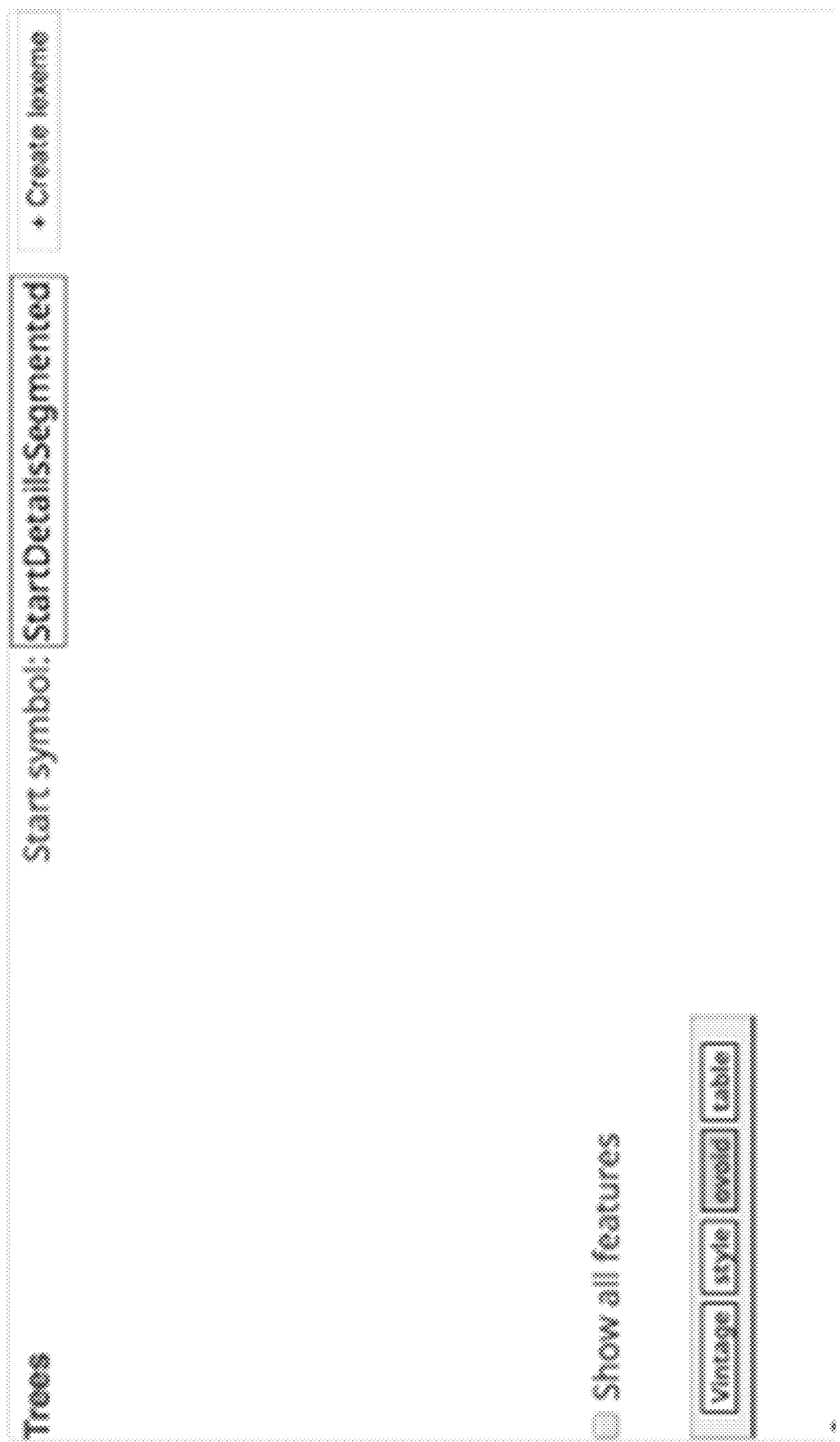
Figure 8:
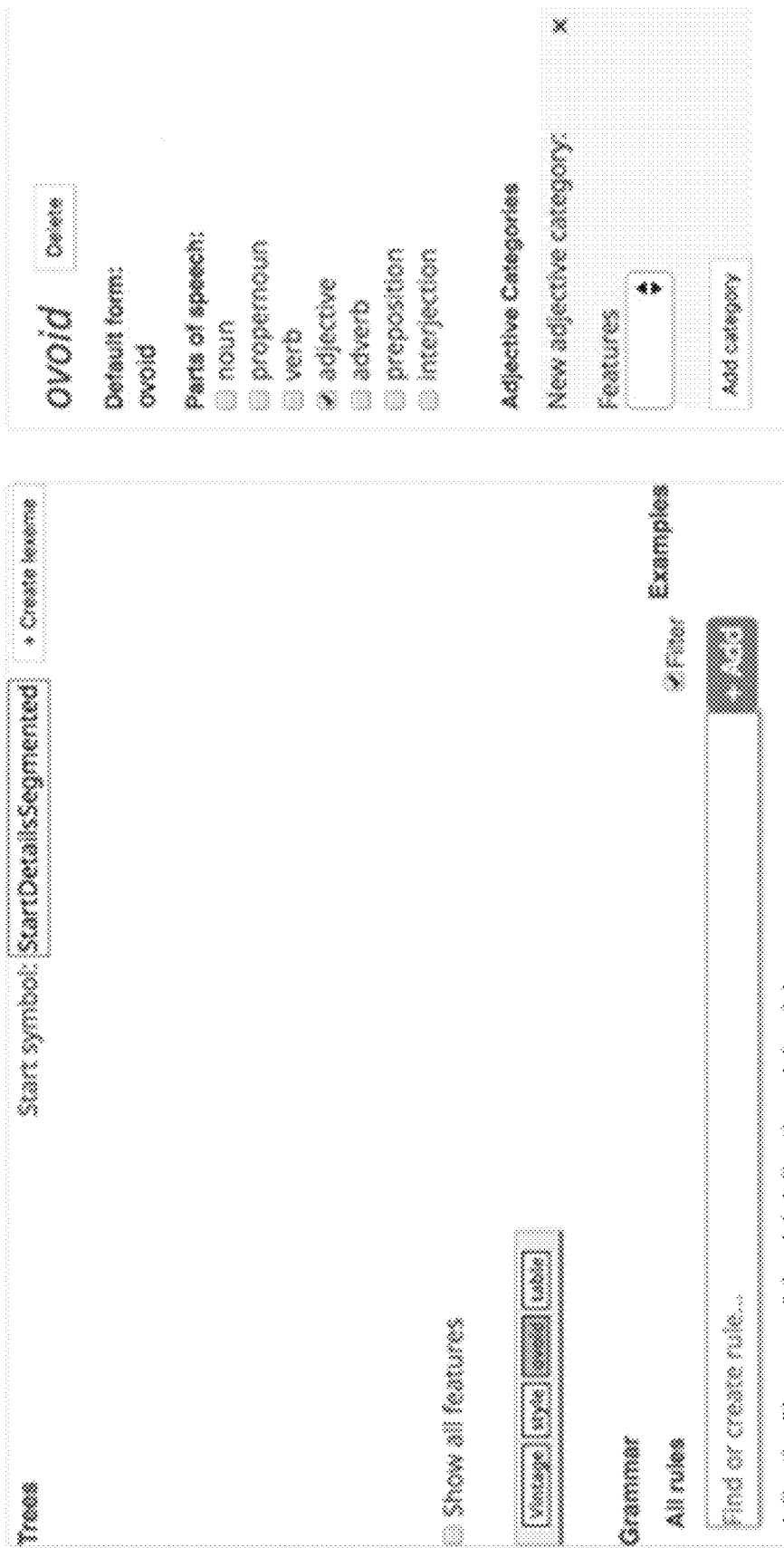
Figure 9:
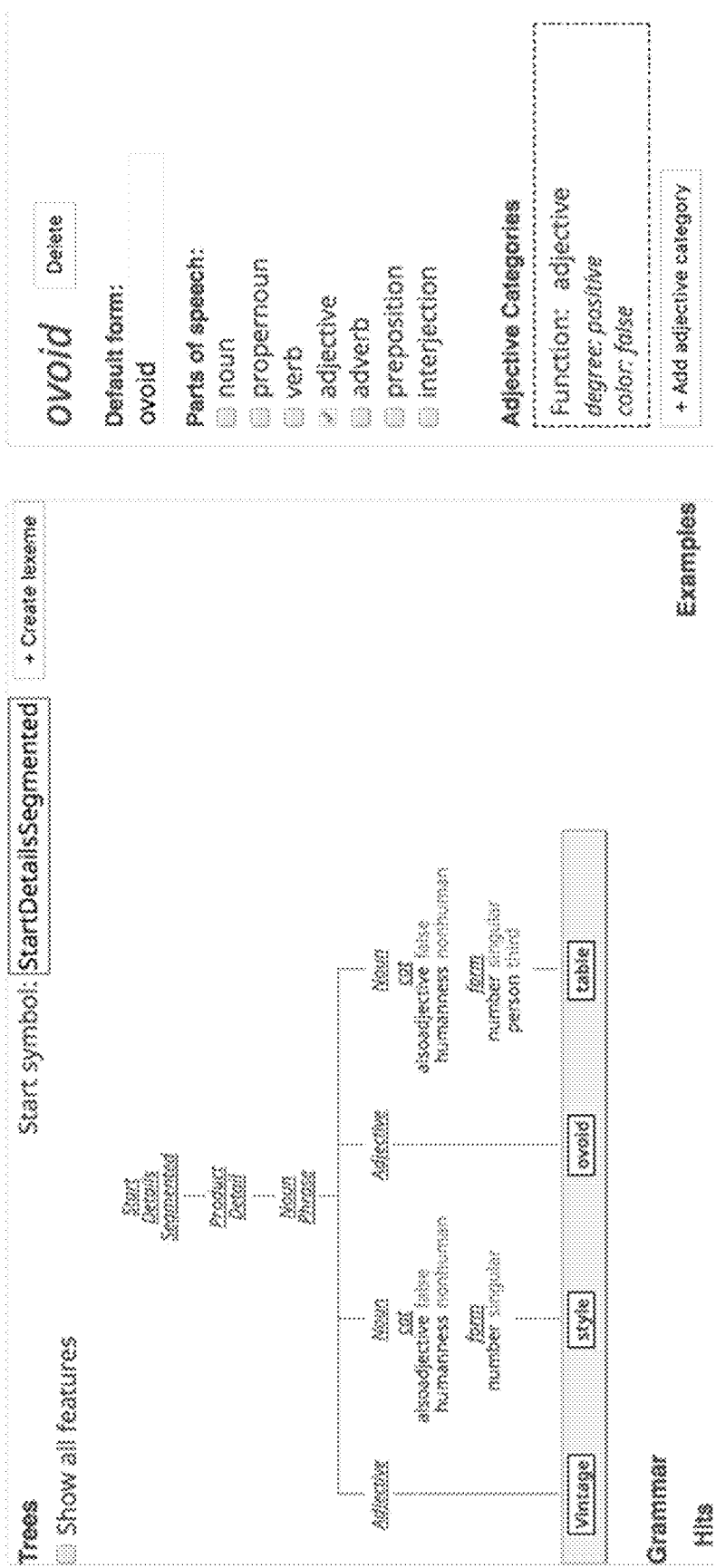

FIGS. 6-9 show examples of generating a lexical rule via the GUI. FIG. 6 shows that a user may select and view an element of a sentence. For example, with an existing sentence, a user may click "reclining" to see it classed as an Adjective. FIGS. 7-9 show examples of a rule result and a user may be guided by indicators to generate a lexical rule. FIG. 7 shows an example of a new sentence which is not parsed (e.g., no tree is shown), and not lexed (e.g., the entire sentence is underlined in red). The word "ovoid" is color coded in red indicating "ovoid" is not lexed, and thereby the whole sentence is not lexed. The user may click "ovoid" to reach the interface shown in FIG. 8. The user may add/select "adjective" for "ovoid" and reach a resultant tree shown in FIG. 9.

Example 2

Figure 10:
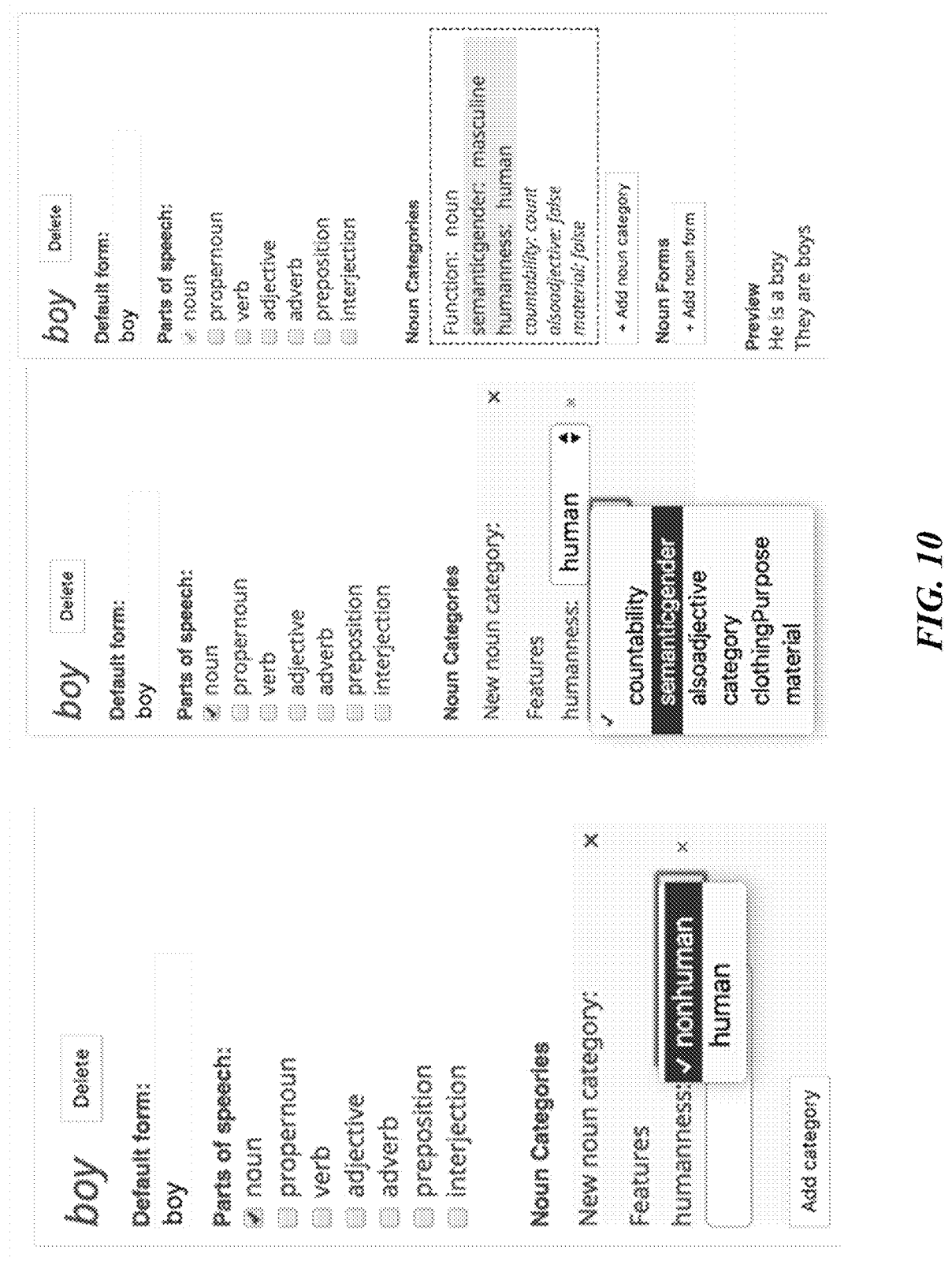

A user may define categorical features via the GUI. Categorical features may define lexical category (e.g., noun, verb, adjective) phrasal category (e.g., noun phrase, verbal phrase, adjectival phrase, prepositional phrase), determiner, adverbs, pronouns, and the like. They are the same for all forms or spellings of that word or sequence. FIG. 10 shows an example of GUI for defining categorical features. In the example, a set of available categorical features may be provided to a user via the GUI. A user may select from the provided categorical features such as via a dropdown menu. In the example, a user may be guided step by step to define the categorical features. For instance, a user may firstly select a word sense (e.g., Noun, Verb, etc). Optionally the user may select a categorical feature. Next, the user may select a value for the feature. The processes may be repeated until an input (e.g., clicking "Add category") is received. The user may then visualize the result in the table where explicitly selected values are highlighted in green, and default values are shown in italic with a white background. A set of new example sentences may be generated automatically in real-time and shown in the "Preview" section.

Example 3

Figure 11:
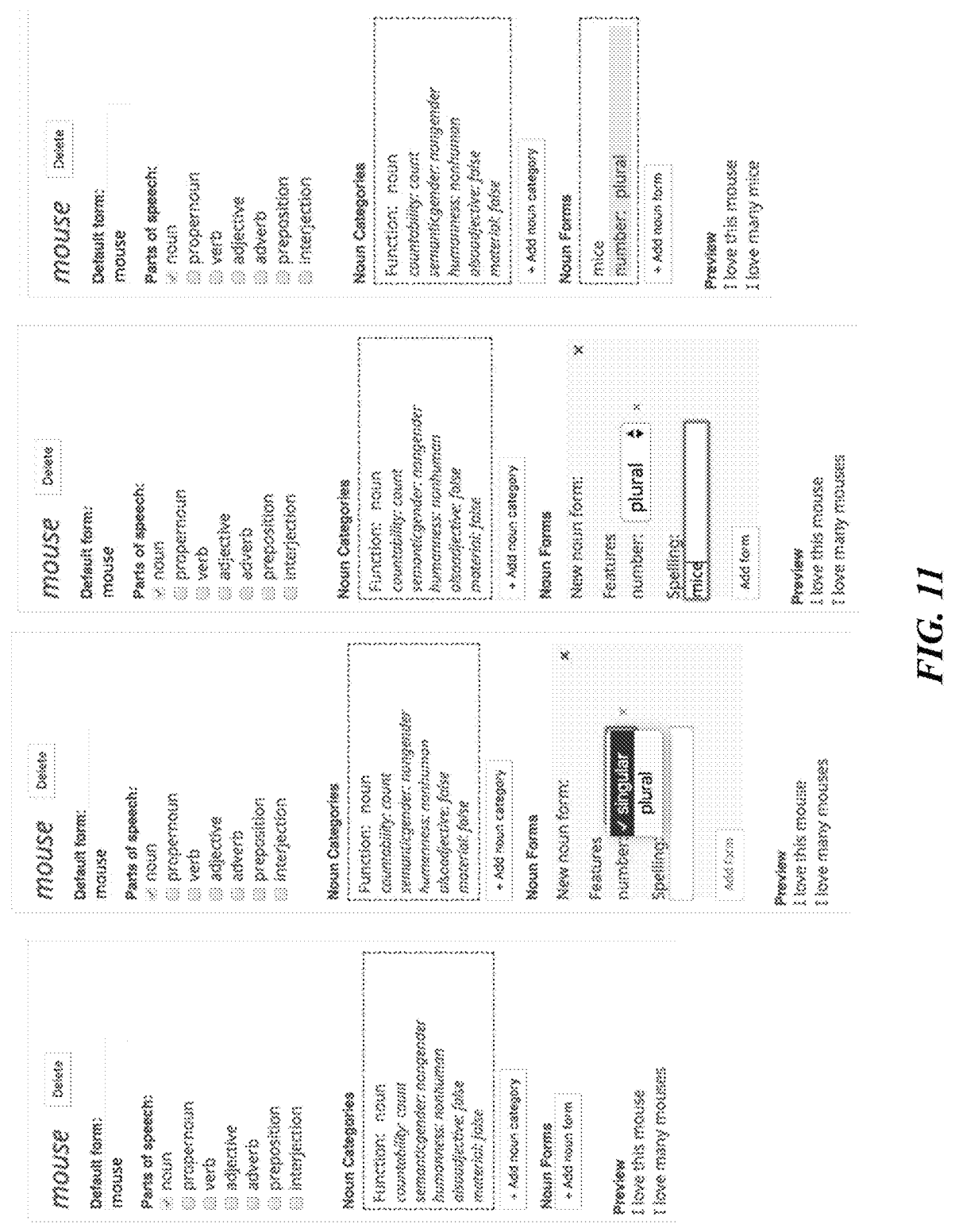

A user may define inflectional features or morphology via the GUI. Inflectional features are those where the spelling or writing of the term differ depending on tense, plurality, syntactic gender and the like. FIG. 11 shows an example of GUI for defining inflectional features. The overall process is similar to the process of defining categorical features as described above. As shown in the example, when 'mouse' is added, the default morphology system may assume that the plural is gained by adding 's' to the end, as shown under "Preview". A user may select a new Noun "form" and define the plural spelling as 'mice' by typing in a text field. The new definition is highlighted in green and a set of new example sentences are generated accordingly in real-time and shown under "Preview."

Example 4

Figure 12:
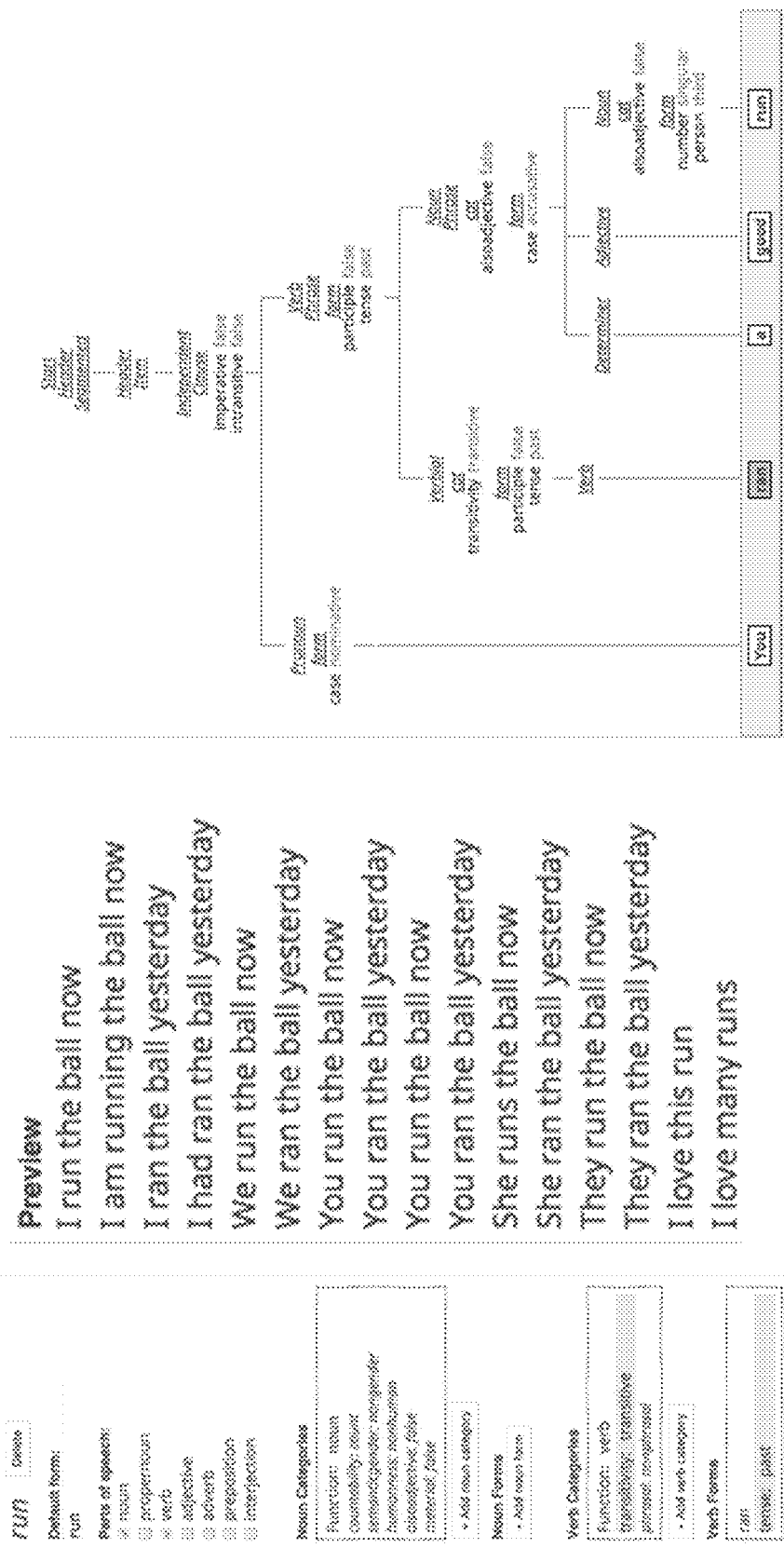
FIG. 12 shows an example of GUI for defining multiple senses for a word and the result of a new rule.

A user may define multiple word senses via the GUI. Some words may have multiple word senses. One example is the word 'run', which can refer to both a Noun and a Verb. By adding both a Noun and a Verb category within the UI, this single word can be defined as both Noun and Verb senses. FIG. 12 shows an example of GUI for defining multiple senses for a word and the result of the new rule. As shown in the example, the rule result is displayed as both example sentences and a tree structure, where the word 'run' is defined as both Noun and Verb.

Example 5

Figure 13A:
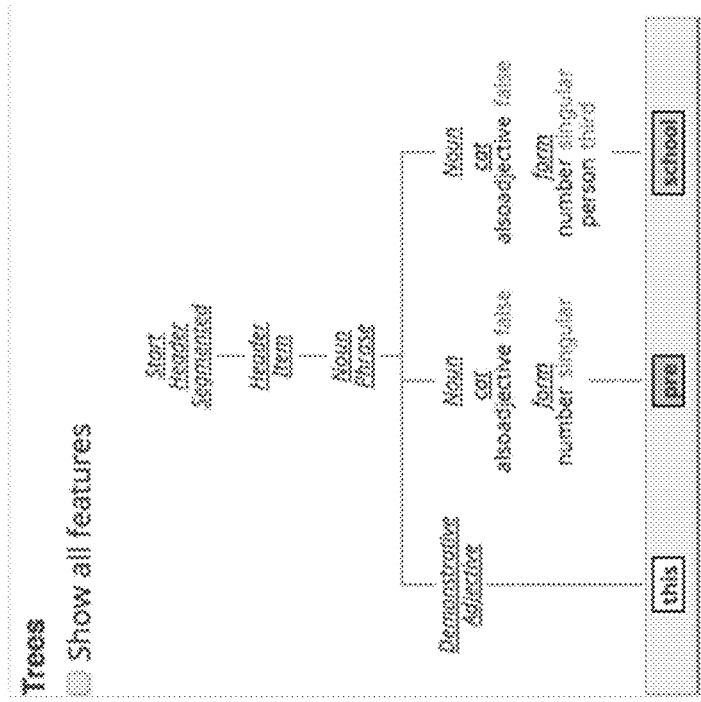
FIG. 13A and FIG. 13B show examples of adding the lexical rule via the GUI.
Figure 13A:
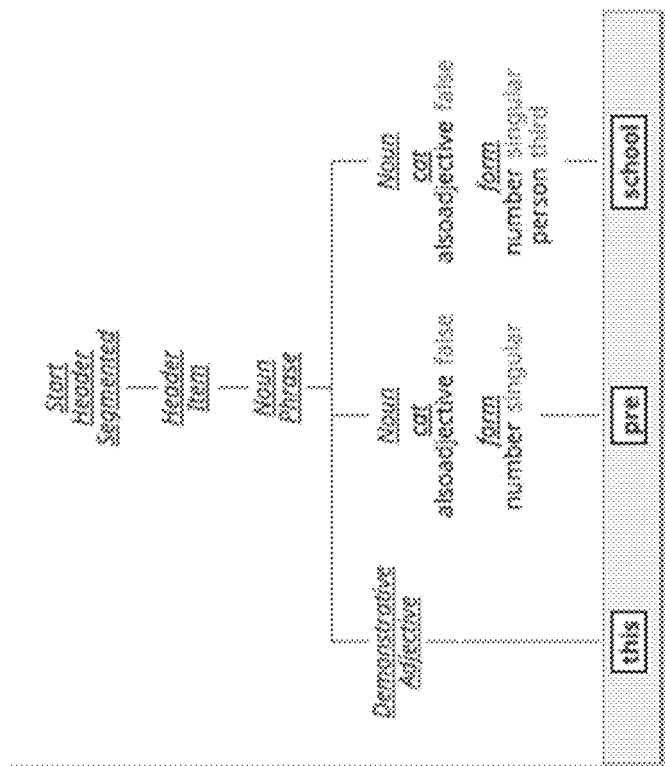
Figure 13B:
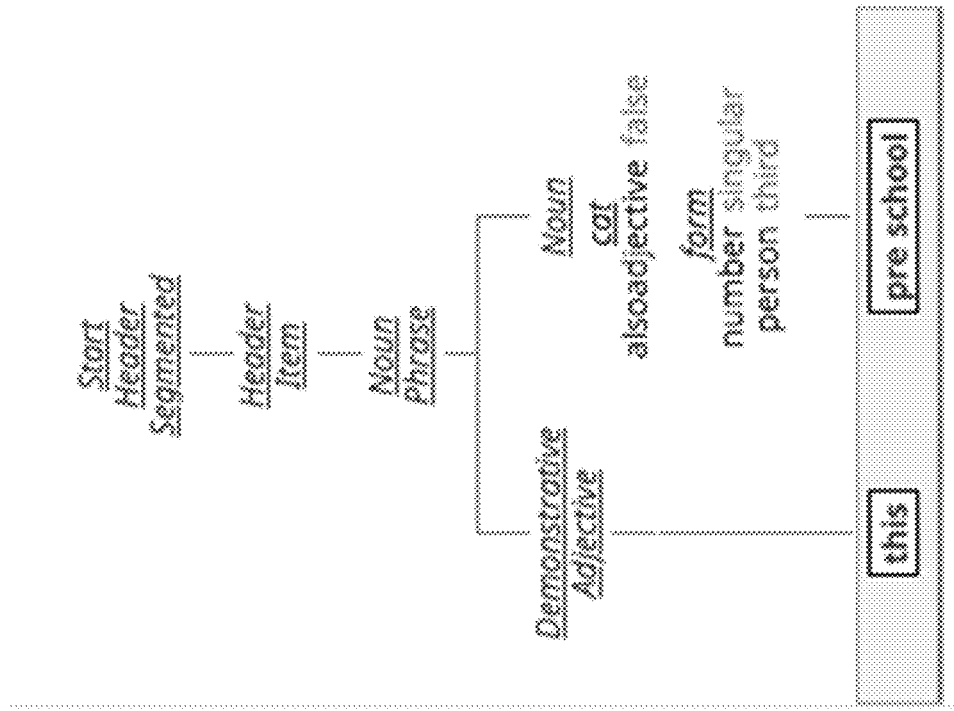
Figure 13B:
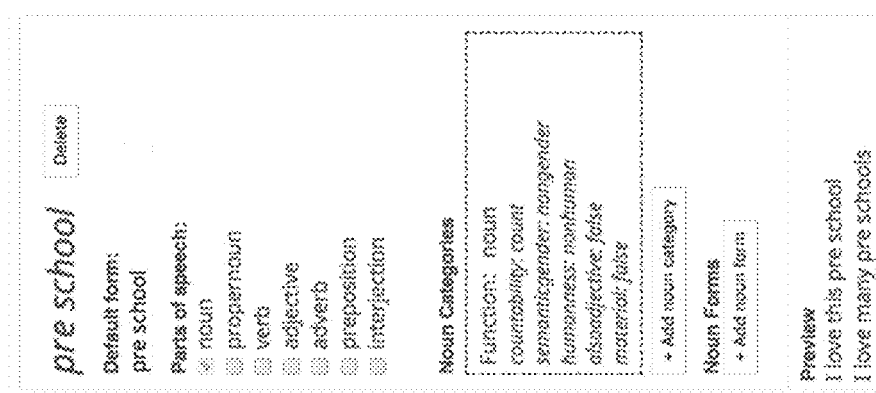
Figure 14:
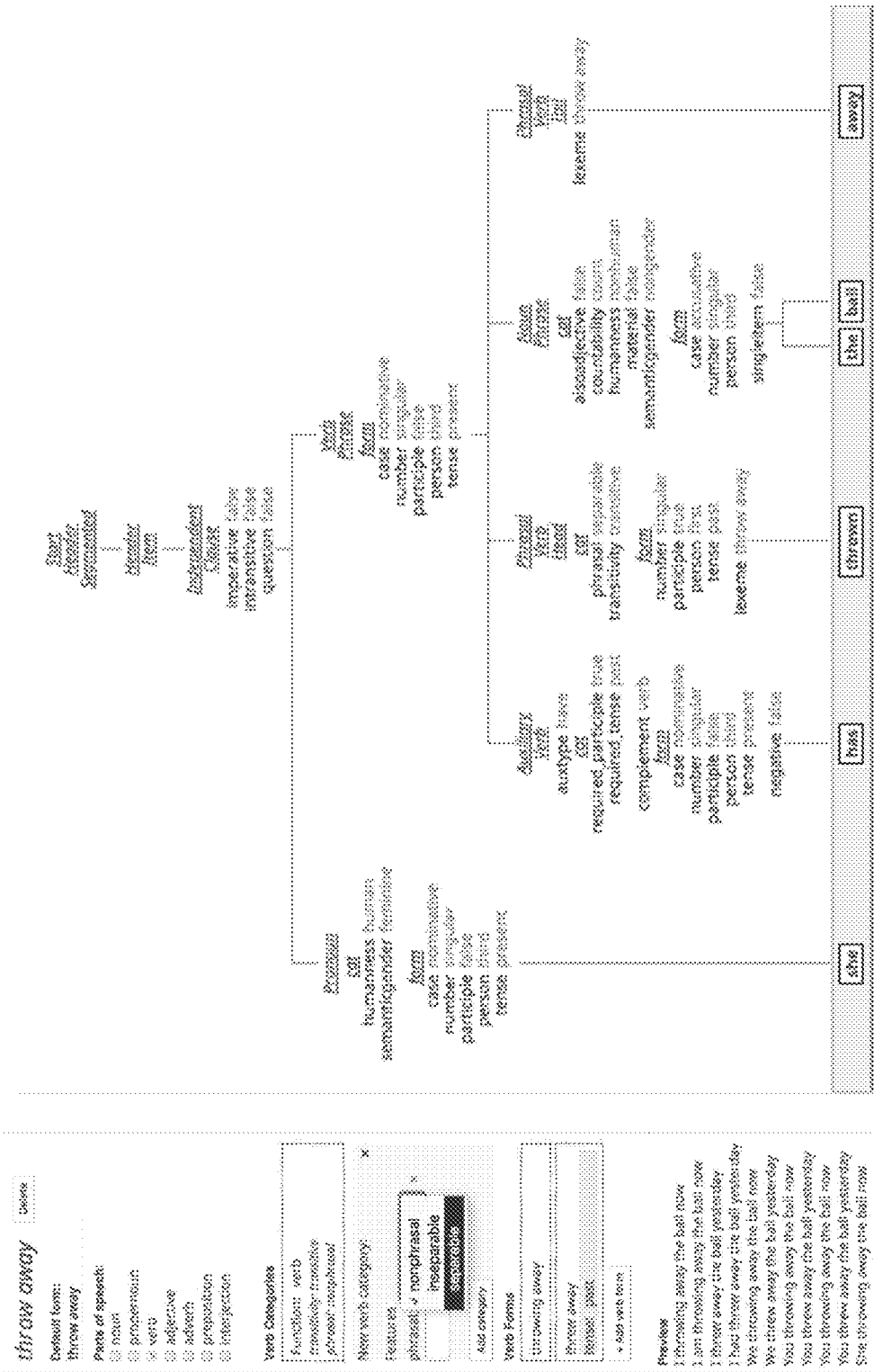
FIG. 14 shows example of a GUI for constructing lexical entries.
Figure 15:
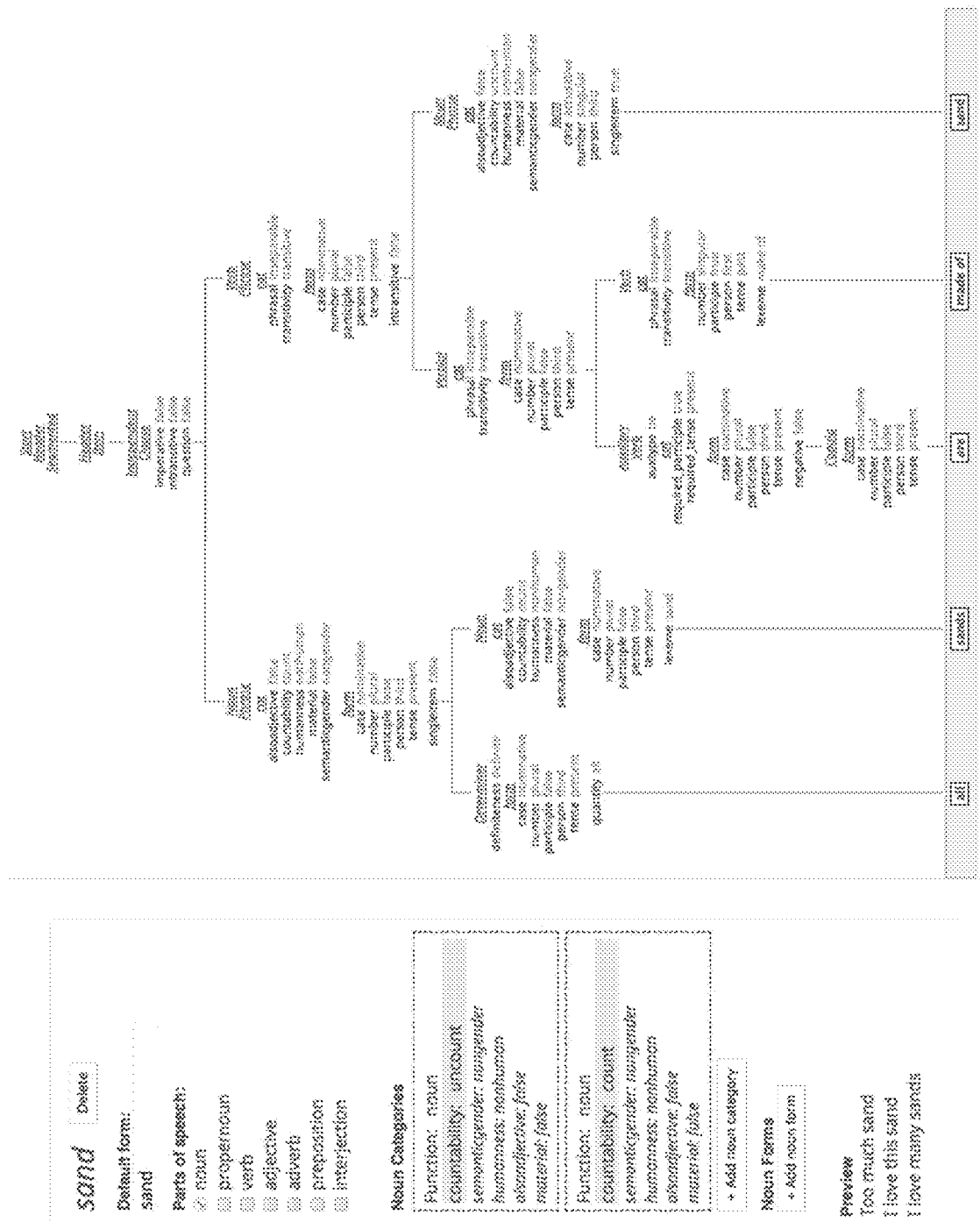
FIG. 15 shows an example of adding two Noun categories via the GUI and both categories can be parsed.

A user may define multiple word lexemes and phrasal verbs via the GUI. In whitespace-default languages, the typical lexical entry is one word. In whitespace-rare languages, many lexical entries may comprise more than one character. In both languages, a lexical entry may be defined as a series of multiple word or characters. FIG. 13A and FIG. 13B show examples of adding the lexical rule via the GUI. In the example, the rule may be added in the GUI using an example sense, by clicking the first word in the multi-word sequence, then the last word in the sequence, then adding a lexical entry described in aforementioned examples. The rule may be generated even when all the words that make up the multi-word entry, are valid words. The rule can also be added when some or none of words have been defined yet. In some languages, the multi-word sequence may have other words inserted into the middle of them—such as the Verb-Object compounds in Chinese, or Phrasal Verbs in English. The GUI may construct such lexical entries as shown in FIG. 14. In the example, the lexeme 'throw away' both obeys the specific morphology that its past participle form is 'thrown away', and the categorical feature 'phrasal='separable" means that it may produce 2 tokens for parsing; a PhrasalVerbHead with 'thrown' and a PhrasalVerbTail with 'away', that can be used in conjunction with grammatical rules to parse an entire sentence. In some languages, a lexical entry may have multiple word senses with different categorical features for each. For example, the word 'sand' in English can refer to both (1) the uncountable Noun describing the material that beaches are made of and (2) a countable Noun referring to a desert. FIG. 15 shows an example of adding two Noun categories via the GUI and both categories can be parsed. The rule result such as the example sentences may show examples for both the countable (e.g., I love many sands) and uncountable (e.g., Too much sand). The user may be able to verify the rule is semantically and grammatically valid by viewing the example sentences.

Example 6

A user may define features hierarchy and lexonomy via the GUI. For a given language, dialect and domain, there may be a series of custom features required to properly parse or translate content. For example, in the domain of fashion, translation may require knowing whether a garment is for the top or bottom half of the body, knowing whether a garment is shorts or a skirt, and knowing whether a garment is designed for swimming or not. Some of these features are hierarchical; that is all skirts go on the bottom half of the body, and are apparel. An example set of feature values is shown in table 1 per below:

| category | subcategory | class |
|---|---|---|
| apparel | top | shirt |
| apparel | top | tshirt |
| apparel | top | singlet |
| apparel | top | sweater |
| apparel | bottom | trousers |
| apparel | bottom | jeans |
| apparel | bottom | shorts |
| apparel | bottom | skirt |
| apparel | bottom | leggings |

In this example, it defines that if 'class'='skirt', then necessarily 'subcategory'='bottom' and 'category'='apparel'.

Figure 16:
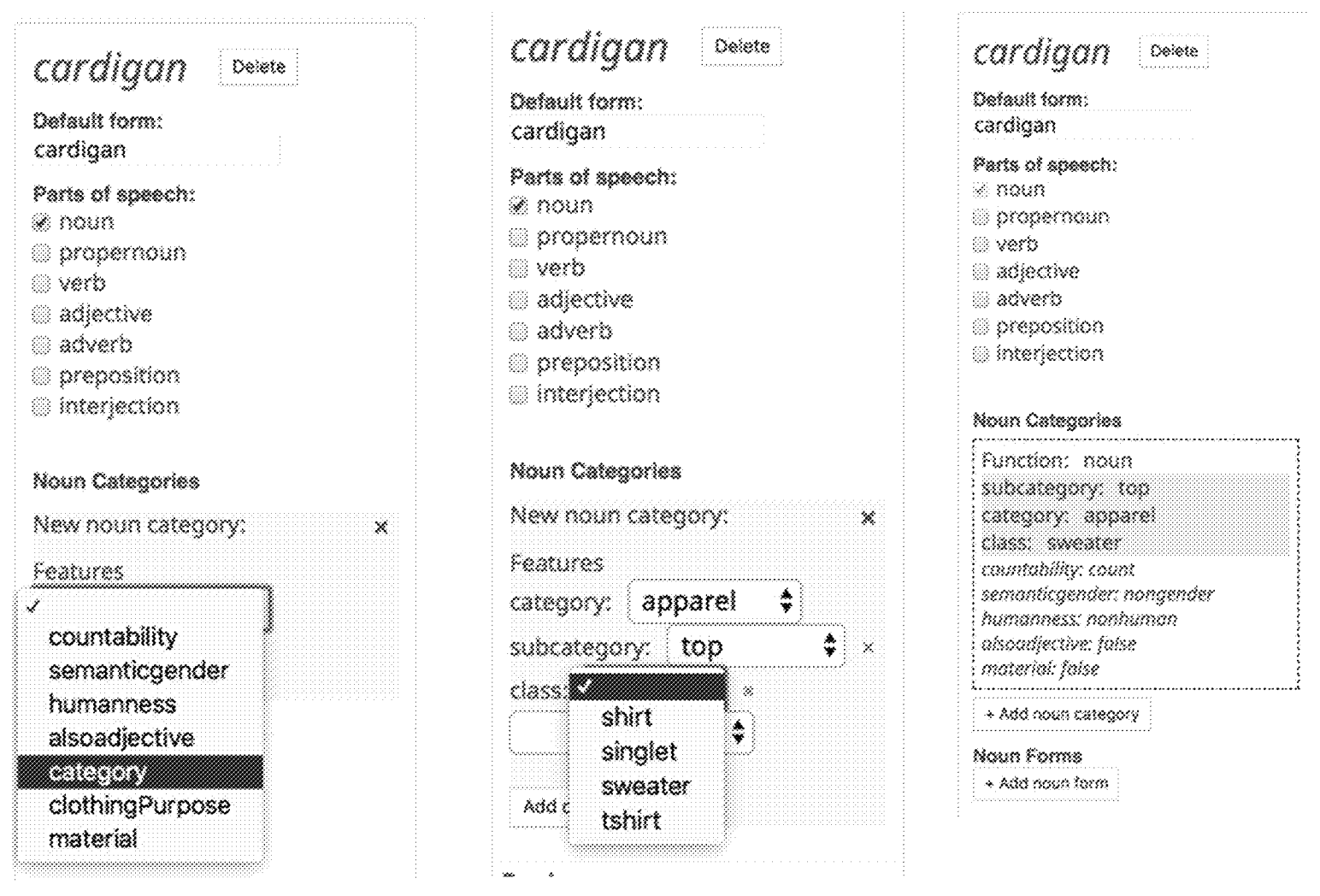

A GUI may be provided to ensure that only valid combinations are shown so that the set of selectable features are forced to depend on what has already been selected. FIG. 16 shows an example of defining feature hierarchies via a GUI. For example, the 'category' must be selected before any 'subcategory' can be selected, and only valid 'subcategory' values are displayed to the user.

Example 7

Figure 17:
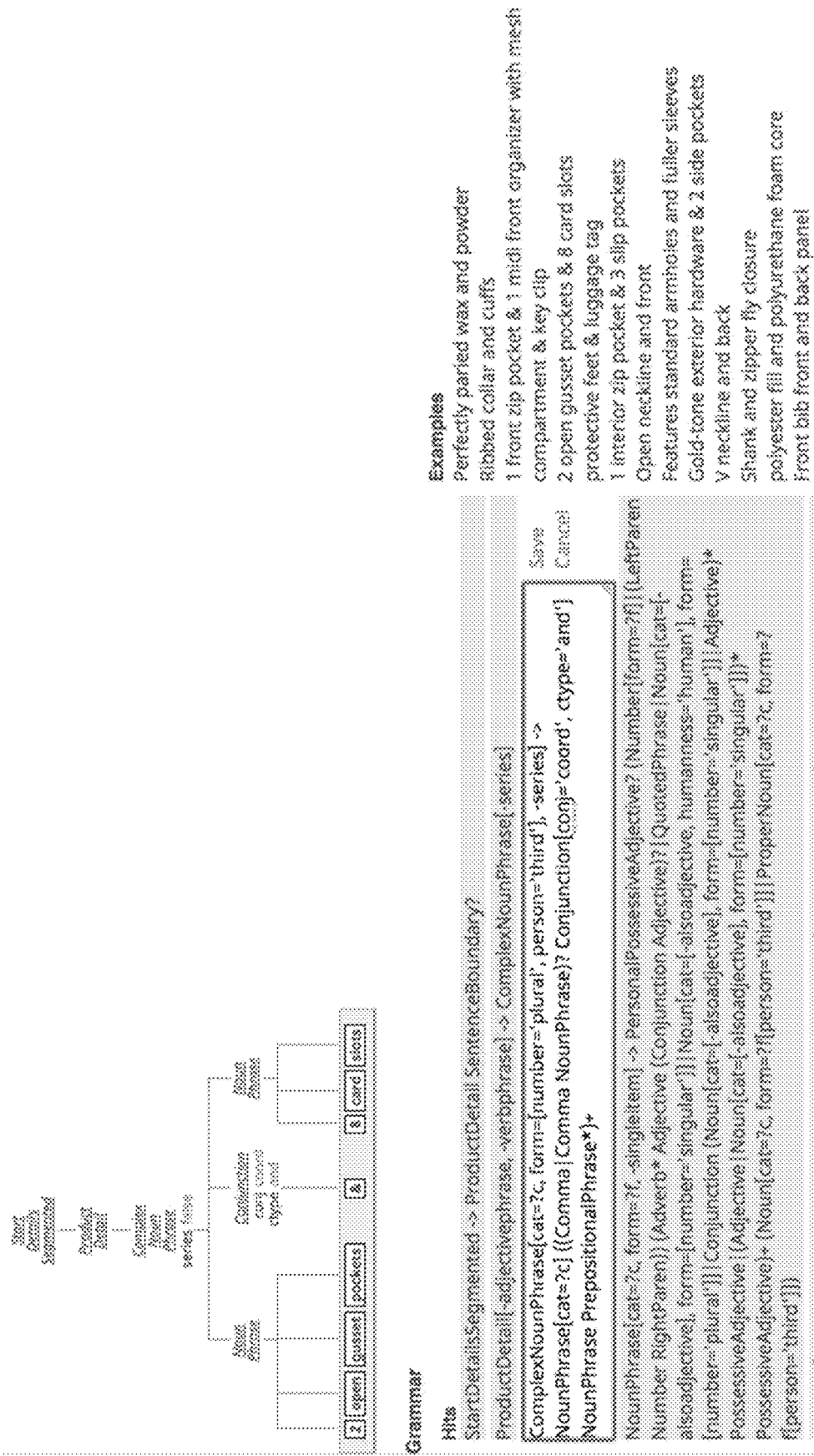
FIG. 17 shows an example of searching for examples parsed by a selected rule.

The provided GUI may allow a user to reverse lookup some or all example sentences by a given rule. FIG. 17 shows an example of searching for examples parsed by a selected rule. In this example, the ComplexNounPhrase rule is used in the example sentence "2 open gusset pockets & 8 card slots", to join the NounPhrases with a Conjunction. A user may clicking on the rule and other sentences using the same rule to parse (e.g, "1 front zip pocket & 1 midi front organizer with mesh compartment & key clip", may be shown.

Example 8

Figure 18:
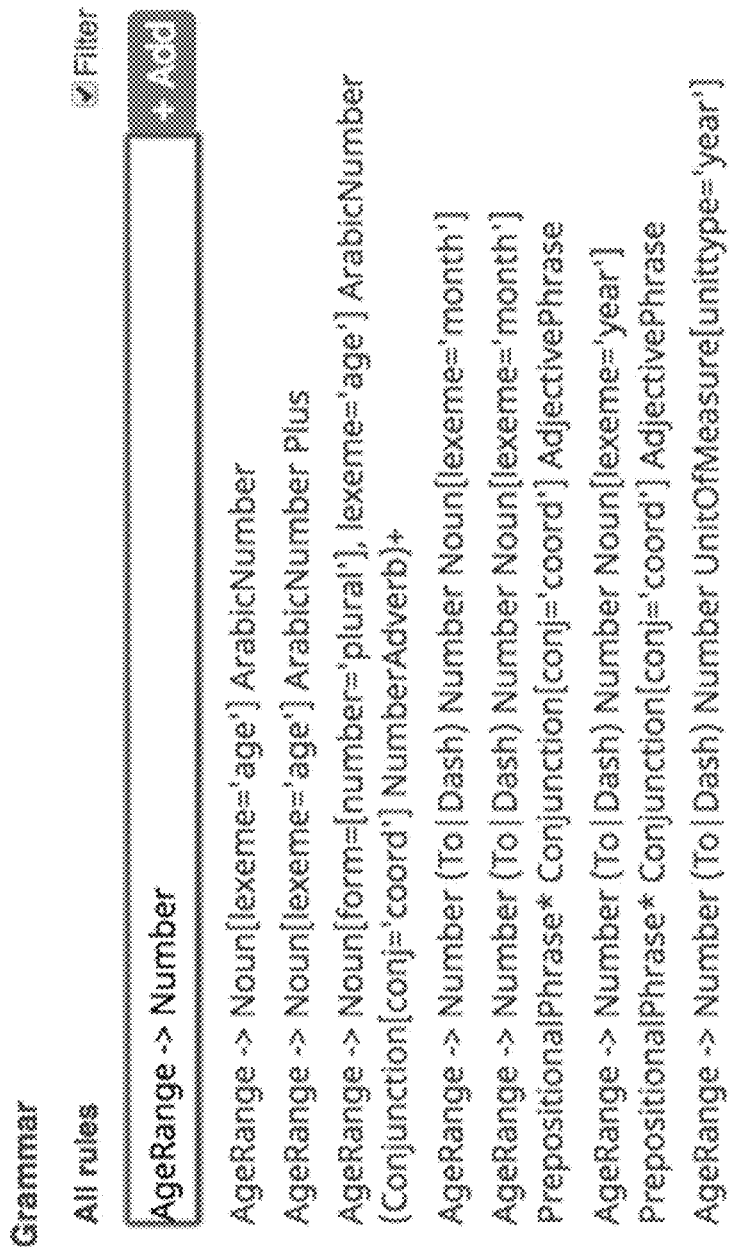
FIG. 18 shows an example of searching rules via a GUI.

The provided GUI may allow a user to search a rule within a given rule collection. The GUI may allow a user to search through all rules in a given collection of rulesets by inputting text in a text field. This search mechanism may utilize spacing to intelligently filter rules according to the sequencing of terms in the rules. FIG. 18 shows an example of searching rules via a GUI. For example, inputting the query 'AgeRange->Number' may return all rules where 'AgeRange' is part of the left hand side, and Number is somewhere in the right hand side.

Example 9

The rule generation engine may utilize explicit context to filter a set of available rules for parsing. For example, the following rules provide different categorical features depending on which customer the sentence is related to:
[company='Nike'] Noun[cat[category='accessory', subcategory='shoe']]->'runner'
[company='Crate&Barrel'] Noun[cat=[category='homeware',subcategory='furniture']]->'runner'

In some cases, a translation request may include contextual information, to help determine how the sentence is parsed. This context may be defined by the translation request, inferred from other aspects of the content, defined in another related sentence, and so on. The context may be selected during the construction of the rule by showing the context of a given example, and allowing the user to click on items in the context to add it to the rule being constructed. FIG. 19 shows an example of adding context to a rule. In the illustrated example, a user may click on 'homeware', to help define a rule relevant to all homeware, or 'ornament', to help define a rule just for ornaments.

Example 10

Figure 20:
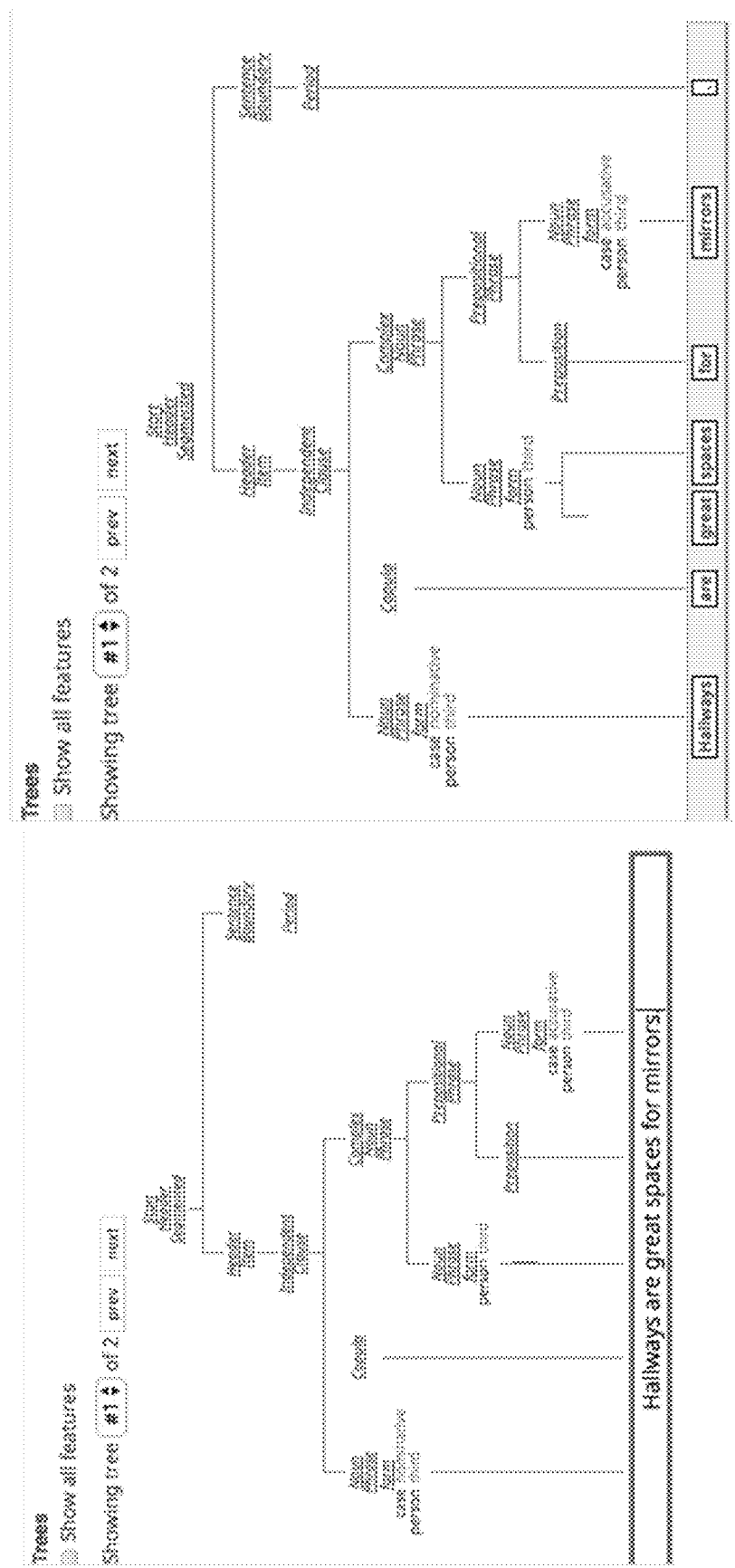
FIG. 20 shows an example of a GUI for a user to switch between different viewing configurations.

A user may view a result of a rule in a user selected format. The rule result can be displayed in switchable user interfaces or switchable formats. For example, an example sentence can be visualized/displayed both as a sequence of text characters, or as the output of a parsing engine. FIG. 20 shows an example of a GUI for a user to switch between different viewing configurations. The GUI may allow a user to direct edit the text of an example in a text box, and smoothly switch to a resulting tree by clicking outside the text box. In the text format as shown in scenario A of the illustrated example, the text can be edited directly. Upon clicking outside the text box, a tree is generated as shown in scenario B, and individual tokens are spaced according to the relevant layout constraints of those leaves' parents and ancestors in the tree.

Example 11

Figure 21:
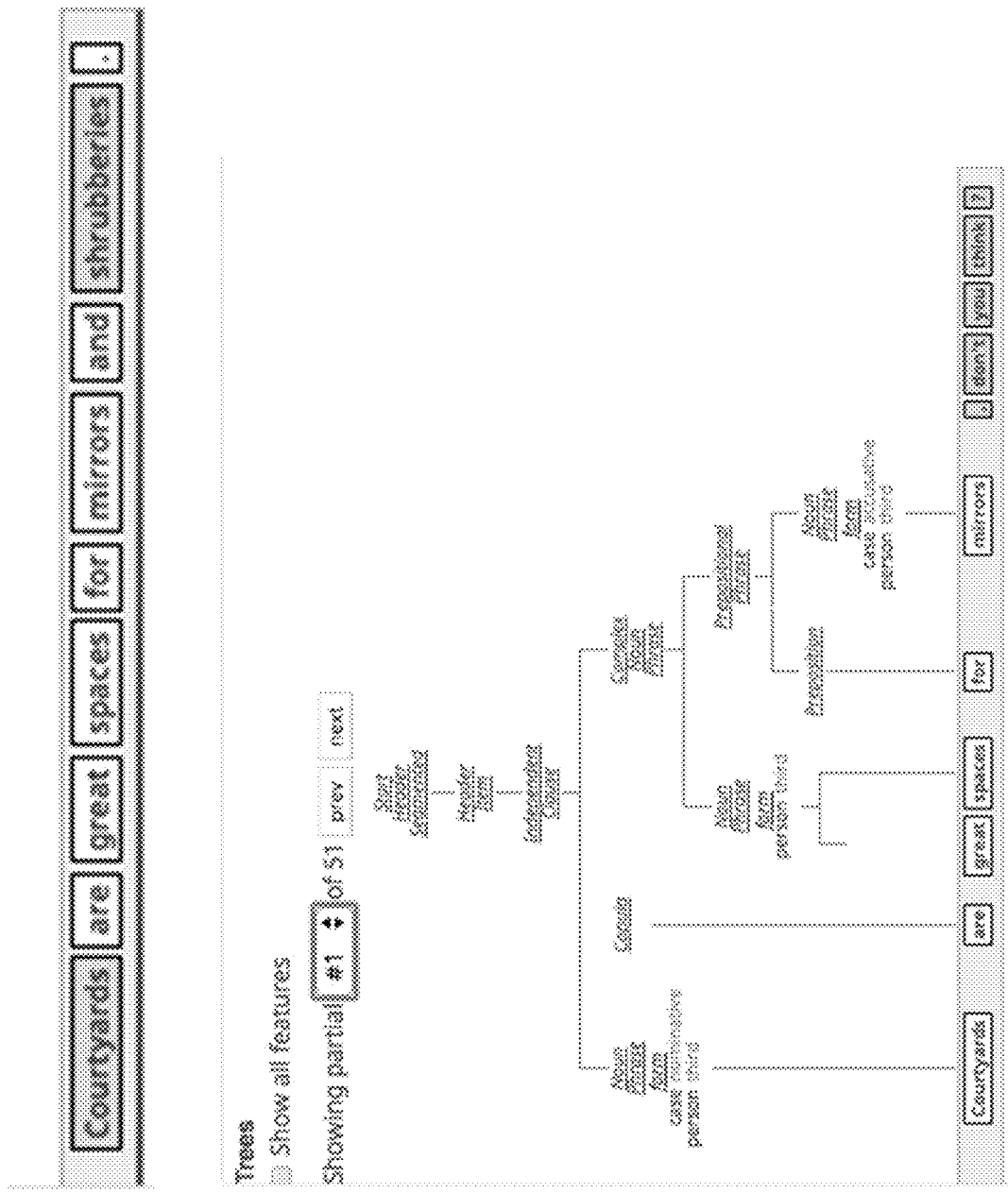
FIG. 21 shows examples of rule result displayed in a GUI with indicators.

A user may view a result of a rule comprising indicators indicating parsability and/or lexability of a text or a portion of a text. A user may visualize the parsability of a portion of text, without requiring all the layout area that the trees would fill. In some cases, the rule generation engine may utilize color coding on the bottom border of the text area. In an example, red may correspond to not lexing, yellow may correspond to not parsing, and green may correspond to parsing. FIG. 21 shows examples of rule result displayed in a GUI with indicators. In the example, if an example sentence doesn't fully lex, the tokens that are lexed or not lexed may be color coded so that a user may be guided to further modify the rule. As shown in scenario A, the tokens "courtyards" and "shrubberies" are unknown to the system and are highlighted in red (i.e., not lexed). In scenario B, if the example sentence lexes, but does not parse, the system may provide a GUI that shows the partial subtrees that the system can handle. Elements of the tree such as nodes may be displayed as interactive elements that a user may select (e.g., clicking on the node) to drill down the portion that does not parse.

Example 12

Figure 22:
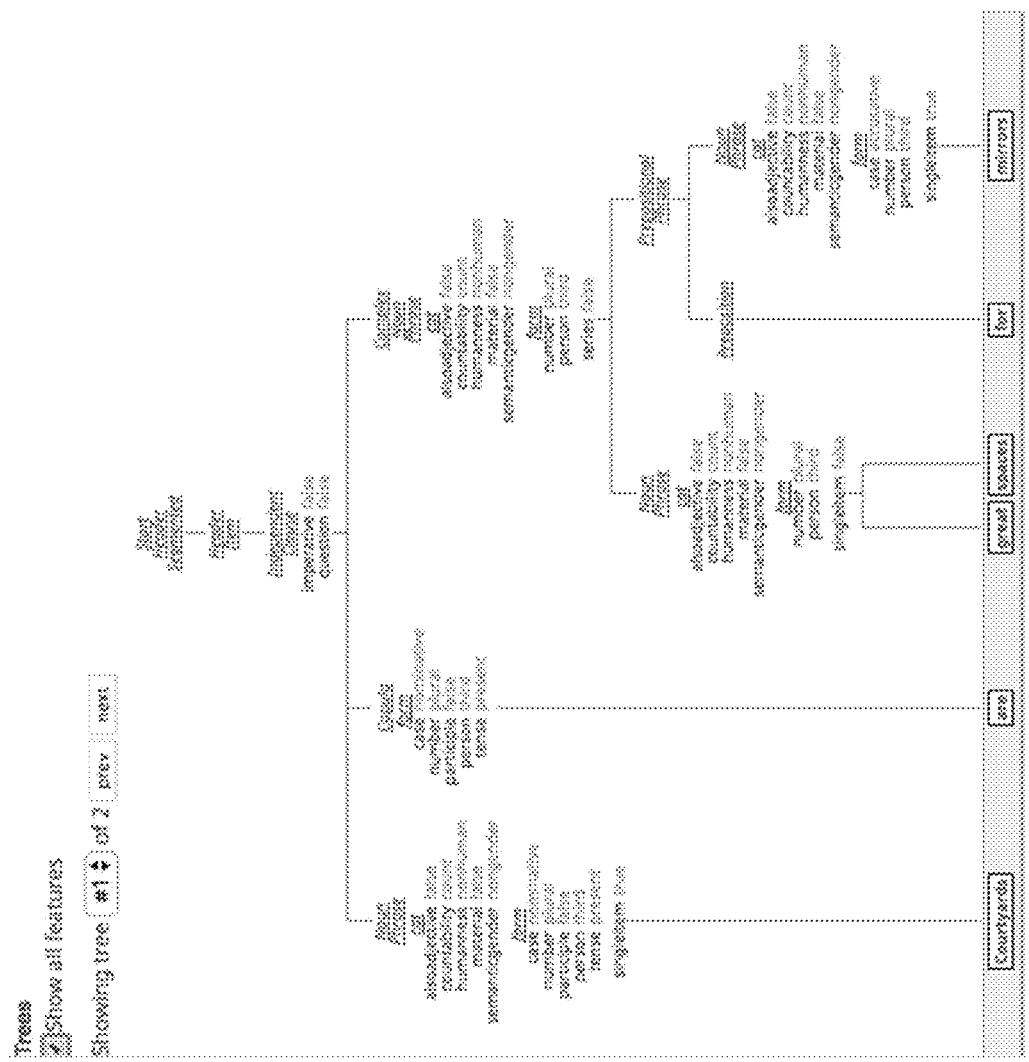
FIG. 22 shows an example of a tree with selected features hidden from the view.

A user may select one or more features to display/not to display in a parse tree. In some cases, a user may select to view one or more hidden features in a parse tree. For a given example sentence, there can be lexical and grammatical features unused by the rules utilized in that parse. In some cases, some of the features in the parse tree may be set as hidden by default. This set of features can be determined based on a hardcoded or pre-determined list, analyzing which features were used in the parse, and so on. The GUI may allow a user to view some or all of the features that were hidden by default. FIG. 22 shows an example of a tree with some features hidden from the view. In the example, the "humanness" and "semanticgender" features may be hidden by default to significantly reduce the height and visual complexity of the tree.

Example 13

Figure 23:
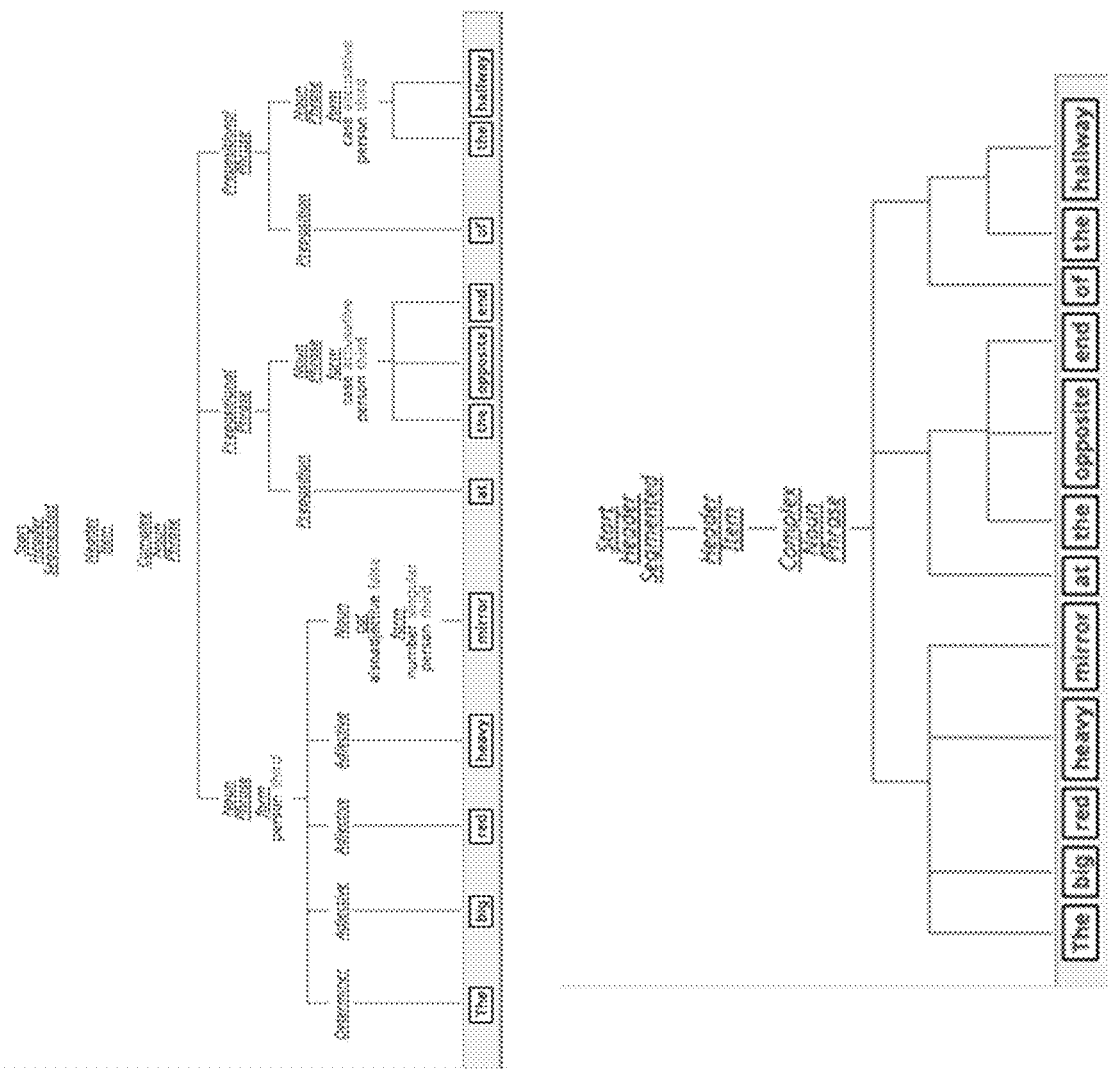
FIG. 23 shows an example of collapsing a portion of a parse tree.

A user may select a portion of a tree or a subtree to be collapsed. In some cases, in order to reduce the space and cognitive load required to visualize a given parse tree, subtrees can be "collapsed". At least a portion of the tree may be selected to not be displayed or be collapsible. A user may select any portion of a parse tree to be in a "collapsed" state or "expanded state" so as to not view or view the selected portion. This provides advantages for fitting more user interested information into a single user interface or a result visualization region of a user interface. In a subtree is in collapsed state, the names and features of any descendant nodes may be hidden, and only the lines given an insight into the tree structure itself. A subtree can be set to be collapsed (i.e., hide from displaying) or expanded by a user command (e.g., clicking on a parent node). In some cases, a state of a subtree (e.g., collapse, expand) may be recorded in the system and may be set as default for displaying the parse tree. FIG. 23 shows an example of collapsing a portion of a parse tree. In scenario A, the NounPhrase is expanded, and the other two subtrees are collapsed. In scenario B, all the subtrees under ComplexNounPhrase are collapsed.

In some cases, the rule result or analysis of the rules can be utilized by other systems such as a machine translation system or can be used for other applications. For example, successful parsing requires that the parser (grammar) have the necessary rules and the lexical analyzer provide all the details needed by the parser to resolve as many ambiguities as it can at that level. The analysis of a rule result such as partial parsing, not parsing or successfully parsing may be used for quantitatively assessment of an impact of a new rule or rule change.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for generating linguistic rules, the method comprising:
   receiving, via one or more interactive elements within a graphical user interface, an user input indicating one or more edits to a rule;
   processing the rule with the one or more edits against a set of template sentence examples to generate a result of the rule, wherein the result of the rule comprises an indicator indicating at least a partial validity of the rule, and wherein the partial validity of the rule is indicated by a partial parse tree structure; and
   outputting the result of the rule for display within the graphical user interface in a user-selected format.

2. The computer-implemented method of claim 1, wherein the partial validity of the rule includes partial validity of the rule related to a lexing process indicated by color-coded tokens.

3. The computer-implemented method of claim 1, wherein the partial validity of the rule includes partial validity of the rule related to a parsing process indicated by the partial parse tree structure.

4. The computer-implemented method of claim 1, wherein the rule is a linguistic rule related to a parsing process or a lexing process.

5. The computer-implemented method of claim 1, wherein the result of the rule comprises an interactive tree structure including one or more interactive components corresponding to one or more lexical tokens.

6. The computer-implemented method of claim 5, wherein the one or more interactive components are displayed with indicators indicating whether a corresponding token is lexed or not.

7. The computer-implemented method of claim 5, wherein the one or more interactive components is selectable such that the linguistic information of a lexical token is dynamically displayed upon selection of the corresponding interactive component.

8. The computer-implemented method of claim 5, wherein at least a portion of the interactive tree structure is collapsible.

9. The computer-implemented method of claim 5, further comprising receiving an input to hide or display one or more lexical or grammatical features that are not used by the rule in the tree structure.

10. The computer-implemented method of claim 5, wherein the result of the rule is displayed in switchable formats including a text format and a tree format.

11. The computer-implemented method of claim 1, wherein the user selected format comprises a text format, a tree format, and a tree with user-selected features for visualization.

* * * * *